US012080939B2

(12) United States Patent
Teresi et al.

(10) Patent No.: US 12,080,939 B2
(45) Date of Patent: Sep. 3, 2024

(54) MANUFACTURED UTILITY APPARATUS

(71) Applicant: M Towers LLC, Peachtree Corners, GA (US)

(72) Inventors: Marc Teresi, Peachtree Corners, GA (US); Maxym Oleynichenko, Peachtree Corners, GA (US)

(73) Assignee: M Towers LLC, Peachtree Corners, GA (US)

(*) Notice: Subject to any disclaimer, the term of this patent is extended or adjusted under 35 U.S.C. 154(b) by 403 days.

(21) Appl. No.: 17/582,270

(22) Filed: Jan. 24, 2022

(65) Prior Publication Data

US 2022/0238985 A1 Jul. 28, 2022

Related U.S. Application Data

(60) Provisional application No. 63/276,521, filed on Nov. 5, 2021, provisional application No. 63/140,874, filed on Jan. 24, 2021.

(51) Int. Cl.
*H01Q 1/38* (2006.01)
*H01Q 1/24* (2006.01)
*H01Q 19/24* (2006.01)

(52) U.S. Cl.
CPC ............... *H01Q 1/246* (2013.01); *H01Q 1/38* (2013.01); *H01Q 19/24* (2013.01)

(58) Field of Classification Search
CPC ........... H01Q 1/246; H01Q 19/24; H01Q 1/38
USPC ........................................................... 455/561
See application file for complete search history.

(56) References Cited

U.S. PATENT DOCUMENTS 3,716,649 A 2/1973 Smith et al.
3,876,819 A 4/1975 Boyd et al.
4,621,476 A 11/1986 MacGregor
6,177,630 B1 1/2001 Stensgaard
6,515,220 B1 2/2003 Carpenter, Jr.
7,855,337 B2 * 12/2010 Scherer .................... H02B 1/50 361/689
9,768,603 B2 * 9/2017 Jensen .................... F03D 13/20
(Continued)

FOREIGN PATENT DOCUMENTS

CN 104538751 A 4/2015
CN 204257835 U 4/2015
(Continued)

*Primary Examiner* — April G Gonzales
(74) *Attorney, Agent, or Firm* — BEKIARES ELIEZER LLP

(57) ABSTRACT

In one aspect, the present disclosure relates to a manufactured utility apparatus that includes a base module, an ice bridge module attached to the base module, and an equipment cabinet module attached to the base module. The manufactured utility apparatus may include a cable securing module attached to the base module. The cable securing module may be configured to electrically connect the utility apparatus and a utility resource. The manufactured utility apparatus may further include an H-frame module attached to the base module, and an antenna module attached to the base module, the antenna module being operatively connected to the utility resource. The manufactured utility apparatus may include a grounding module configured to electrically ground the utility apparatus and the utility resource.

20 Claims, 17 Drawing Sheets

(56) References Cited

U.S. PATENT DOCUMENTS

| | | | | |
|---|---|---|---|---|
| 2002/0156588 | A1* | 10/2002 | Arndt | G08B 19/02 702/40 |
| 2002/0190914 | A1* | 12/2002 | Gillen | H01Q 1/1242 343/890 |
| 2003/0148794 | A1* | 8/2003 | Wilson, Jr. | H01Q 1/1242 455/562.1 |
| 2007/0181323 | A1* | 8/2007 | Kim | H01R 4/66 174/3 |
| 2015/0283906 | A1* | 10/2015 | Glinka | B60L 5/22 191/55 |
| 2017/0254181 | A1* | 9/2017 | Konduc | E21B 33/06 |
| 2018/0254569 | A1* | 9/2018 | LaBarge | H01R 4/66 |
| 2023/0119311 | A1* | 4/2023 | Teresi | G06Q 40/08 705/4 |

FOREIGN PATENT DOCUMENTS

| | | | |
|---|---|---|---|
| CN | 104767042 | A | 7/2015 |
| CN | 104966912 | A | 10/2015 |
| CN | 105932437 | A | 9/2016 |
| CN | 105958225 | A | 9/2016 |
| CN | 106207509 | A | 12/2016 |
| CN | 106684582 | A | 5/2017 |
| CN | 106785511 | A | 5/2017 |
| CN | 106848628 | A | 6/2017 |
| CN | 107342467 | A | 11/2017 |
| EP | 0404691 | A2 | 12/1990 |
| EP | 2725158 | A1 | 4/2014 |
| FR | 1342964 | A | 11/1963 |
| FR | 1539205 | A | 9/1968 |
| FR | 2476920 | A1 | 8/1981 |
| JP | 3028113 | B2 | 2/2000 |
| JP | 2003213813 | A | 7/2003 |
| JP | 2009102896 | A | 5/2009 |
| JP | 5260437 | B2 | 5/2013 |
| KR | 200163436 | Y1 | 2/2000 |
| KR | 20040024211 | A | 3/2004 |
| KR | 20060013816 | A | 2/2006 |
| KR | 100709145 | B1 | 4/2007 |
| KR | 100852473 | B1 | 8/2008 |
| KR | 20080093511 | A | 10/2008 |
| KR | 200443914 | Y1 | 3/2009 |
| KR | 100930992 | B1 | 12/2009 |
| KR | 100998316 | B1 | 12/2010 |
| KR | 200451817 | Y1 | 1/2011 |
| KR | 20110028731 | A | 3/2011 |
| KR | 20110045635 | A | 5/2011 |
| KR | 20110054578 | A | 5/2011 |
| KR | 20110081510 | A | 7/2011 |
| KR | 101092918 | B1 | 12/2011 |
| KR | 101113179 | B1 | 2/2012 |
| KR | 101131771 | B1 | 4/2012 |
| KR | 101145917 | B1 | 5/2012 |
| KR | 101179941 | B1 | 9/2012 |
| KR | 20160147403 | A | 12/2016 |
| KR | 20190097724 | A | 8/2019 |
| KR | 102107351 | B1 | 5/2020 |
| KR | 20200117126 | A | 10/2020 |
| WO | 9714196 | A1 | 4/1997 |
| WO | 2010027154 | A2 | 3/2010 |
| WO | 2014133233 | A1 | 9/2014 |
| WO | 2014133234 | A1 | 9/2014 |

* cited by examiner

MANUFACTURED UTILITY APPARATUS

RELATED APPLICATIONS

Under provisions of 35 U.S.C. § 119(e), the Applicant claims benefit of U.S. Provisional Application No. 63/140,874 filed on Jan. 24, 2021 and U.S. Provisional Application No. 63/276,521 filed on Nov. 5, 2021, and having inventors in common, which are incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to cellular network platforms, installation, and functionality.

BACKGROUND

Cellular networks continue to be enhanced and improved as technology improves. The latest improvement, fifth generation (5G) cellular networks, are being implemented throughout the world. By providing ultrafast speeds, higher bandwidth capacity, and ultra-low latency, 5G towers provide a superior network compared to its previous generations. However, creating a network grid of 5G, or any future generations of cellular networks, requires installation of new technology on existing cellular network towers, and the building of new towers due to 5G's lower range and poor propagation qualities.

Installation of the new towers, and the upgrading of existing towers can be costly, complicated, and may require different equipment for each tower depending on the specifications and requirements of each tower. There exists a need for an easier, cheaper, and more efficient way for installation of new generation cellular networks.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In one aspect, the embodiments of the present disclosure may provide a manufactured utility apparatus comprising: a base module, an ice bridge module, an equipment cabinet module, a cable securing module, a H-frame module, an antenna module, a grounding module, a generator module, a GPS antenna, a Wi-Fi module, and a lift module.

In another aspect, the embodiments of the present disclosure may provide a method for assembling a manufactured utility apparatus, the method comprising: providing a base module comprising: providing a concrete pad comprising: providing a pullbox aperture configured for housing a pullbox, and providing a plurality of conduit apertures configured for securing the pullbox, connecting the pullbox to the pullbox aperture, providing at least one conduit bushing, and connecting an SO cord to the pullbox; connecting an ice bridge support module to the base module via a plurality of base plates and a plurality of securing means; providing an ice bridge module comprising: providing at least one ice bridge, and connecting at least one trapeze module, via at least one trapeze securing means, to the at least one ice bridge module, connecting the ice bridge module to the ice bridge support module; connecting a GPS antenna to the ice bridge support module; providing an equipment cabinet module comprising: providing an internal housing, securing a Wi-Fi module to the internal housing, securing a battery charging module to the internal housing, securing a server to the internal housing, and securing a security and inventory module to the internal housing, connecting an equipment cabinet module to the base plate module; providing an H-frame module comprising: providing an H-frame, connecting a utility meter module to the H-frame, connecting a disconnect module to the H-frame, and connecting a slack cabinet to the H-frame module; connecting the H-frame module to the base plate module; providing an antenna module comprising: providing a plurality of antenna pipes, connecting a plurality of antennas to the plurality of antenna pipes, and connecting a plurality of remote radio units ("RRU") to the plurality of antenna pipes; connecting the antenna module, via the plurality of antenna pipes, to the base plate module; connecting a cable securing module to the base plate module; securing at least one hybrid cable to the cable securing module; providing a grounding module comprising: providing at least one helical grounding anchor, providing at least one splay module, and providing a plurality of grounding wires; connecting the grounding module to the base plate module; and connecting a generator module to the base plate module.

In another aspect, the embodiments of the present disclosure may provide a method for attaching a manufactured utility apparatus to a cellular tower, the method comprising: providing a manufactured utility apparatus; providing a cellular network distribution site (cell site); connecting a plurality of grounding wires from the manufactured utility apparatus to the cell site; connecting a hybrid cable from manufactured utility apparatus to the cell site; connecting a power means from manufactured utility apparatus to the cell site; disconnecting a plurality of antennas from the manufactured utility apparatus; and connecting the plurality of antennas to the cell site.

In another aspect, the embodiments of the present disclosure may provide a method for deploying a helical grounding anchor, the method comprising: providing a helical grounding anchor comprising: providing a pipe comprising an outer surface and an inner surface, creating a plurality of apertures in the pipe in a substantially vertical orientation, connecting a spiral plate to a first end of the outer surface, and connecting at least one grounding wire proximate to a second end of the outer surface; inserting the helical grounding anchor into a surface; distributing a grounding chemical through the plurality of apertures while the helical grounding anchor is inserted into the surface; and connecting an access well to the second end of the pipe.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
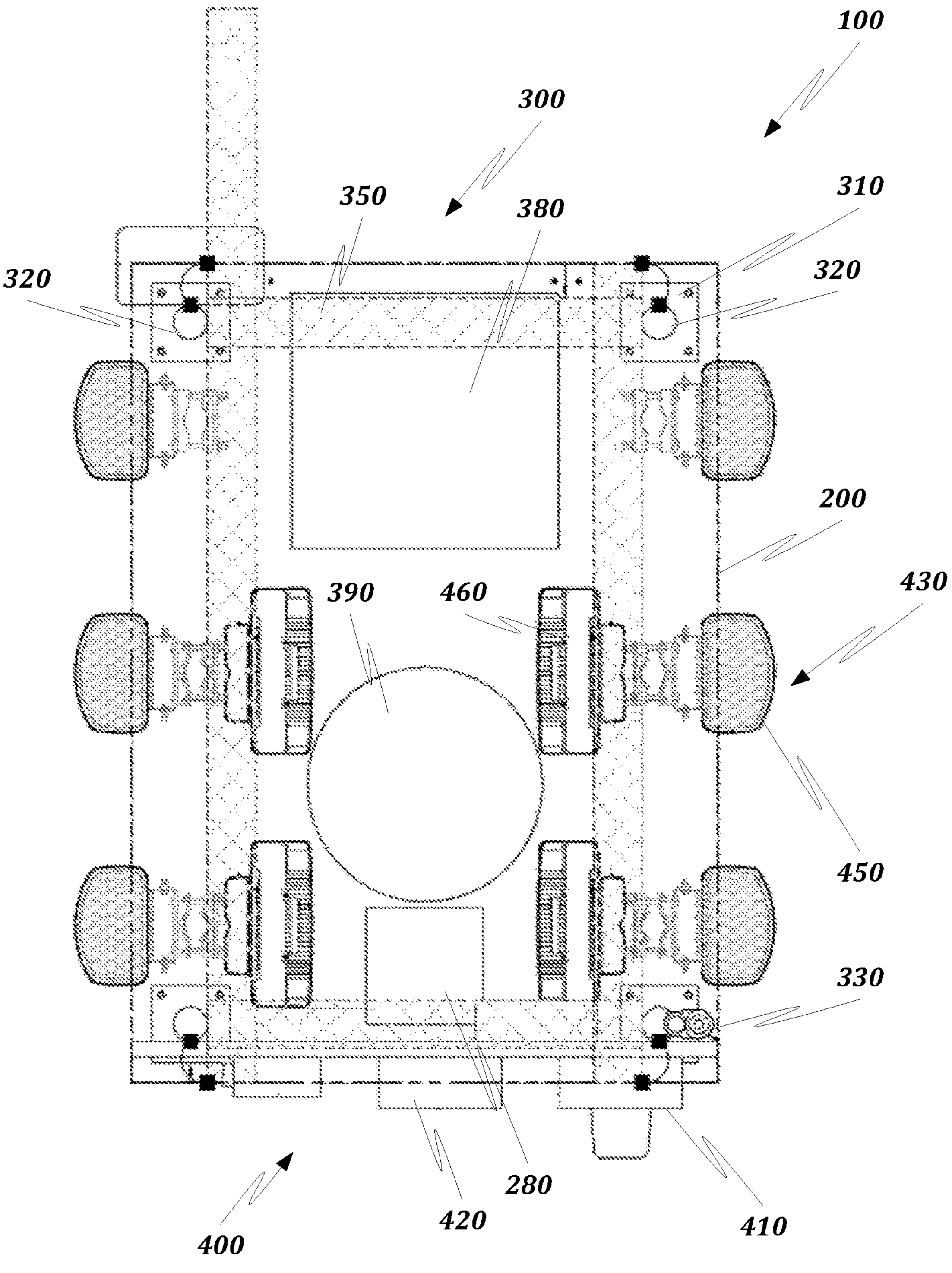
FIG. 1 illustrates a block diagram of a manufactured utility apparatus consistent with the present disclosure.
Figure 2:
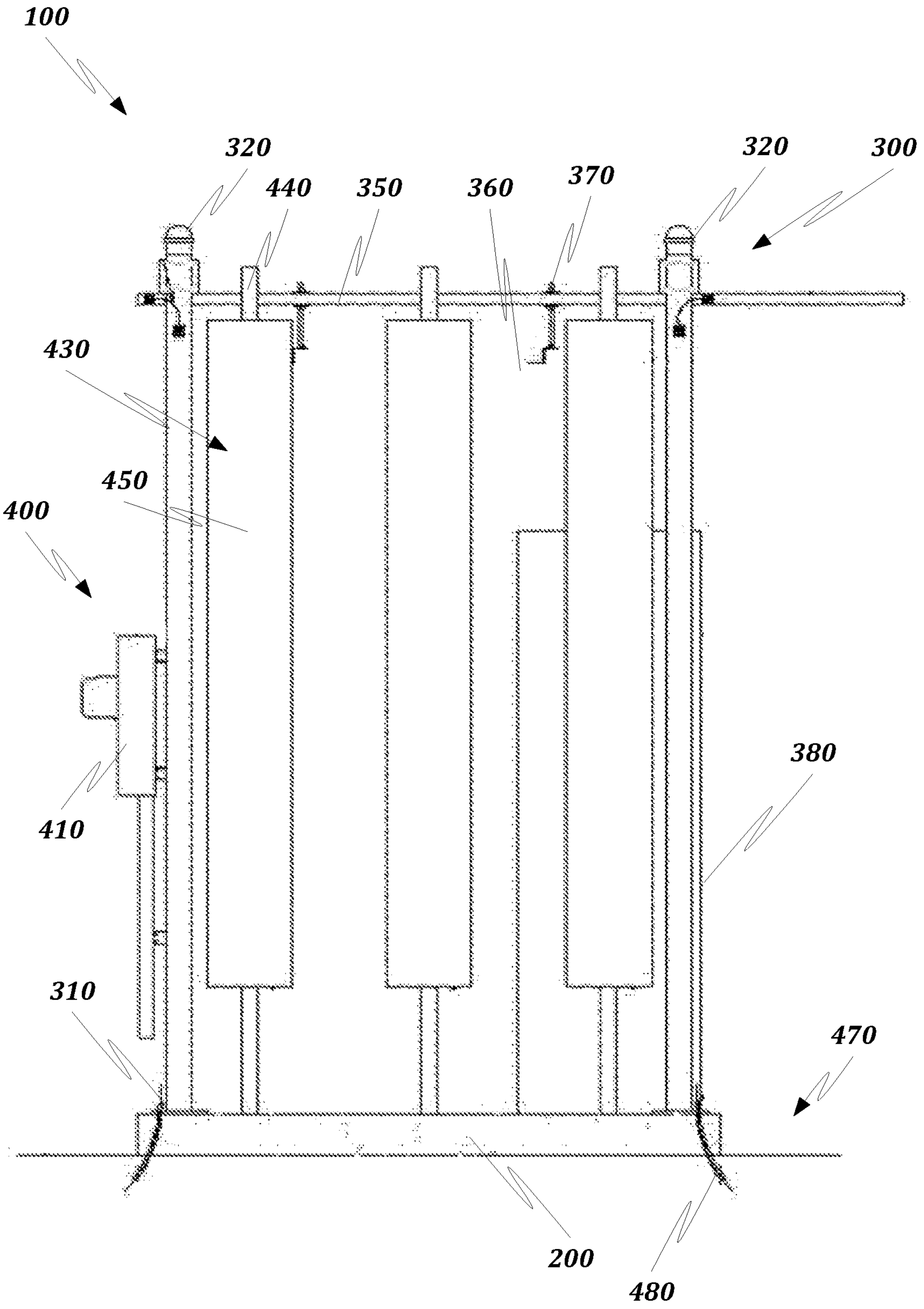
FIG. 2 is a side view thereof.
Figure 3:
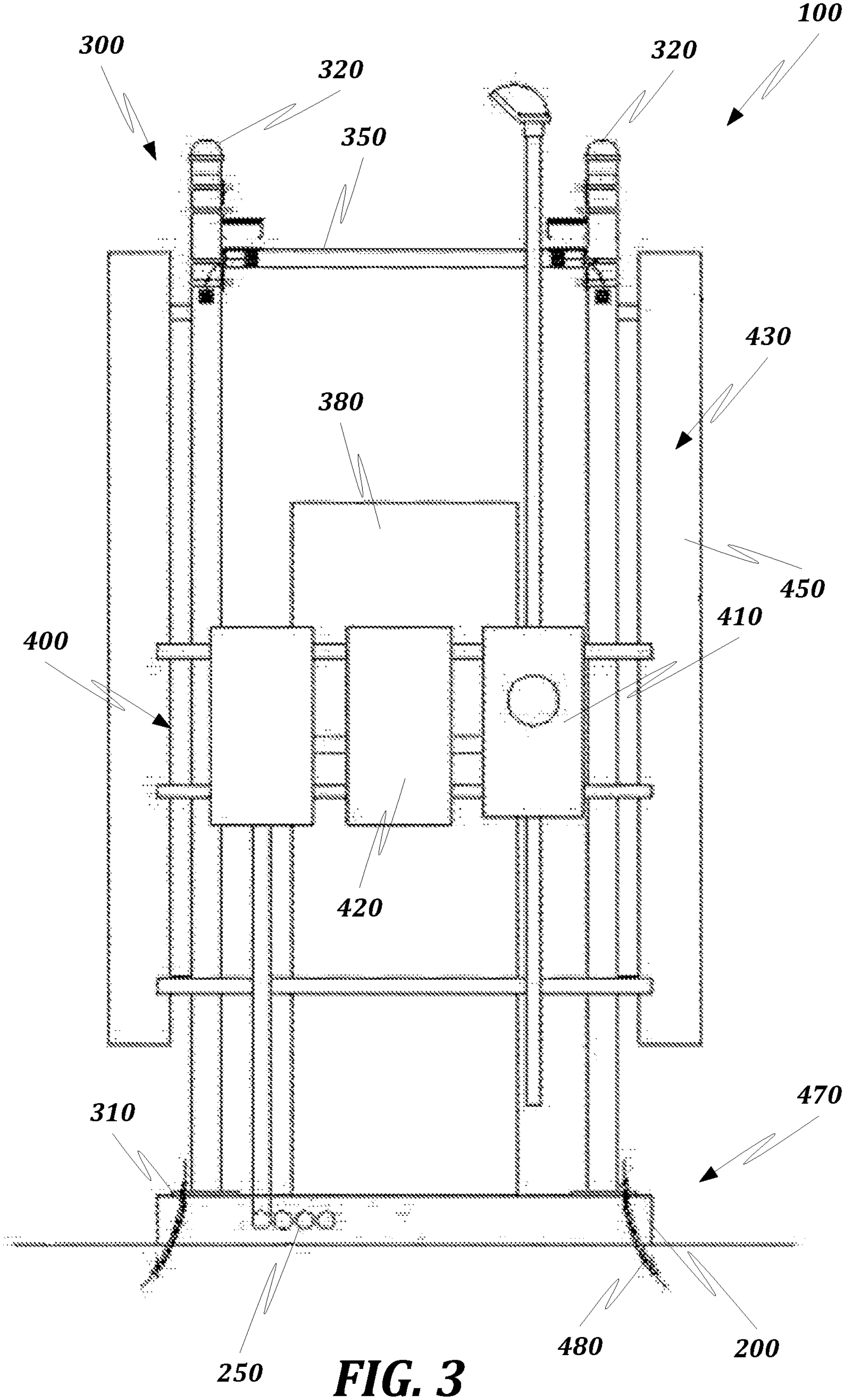
FIG. 3 is a front view thereof.
Figure 4:
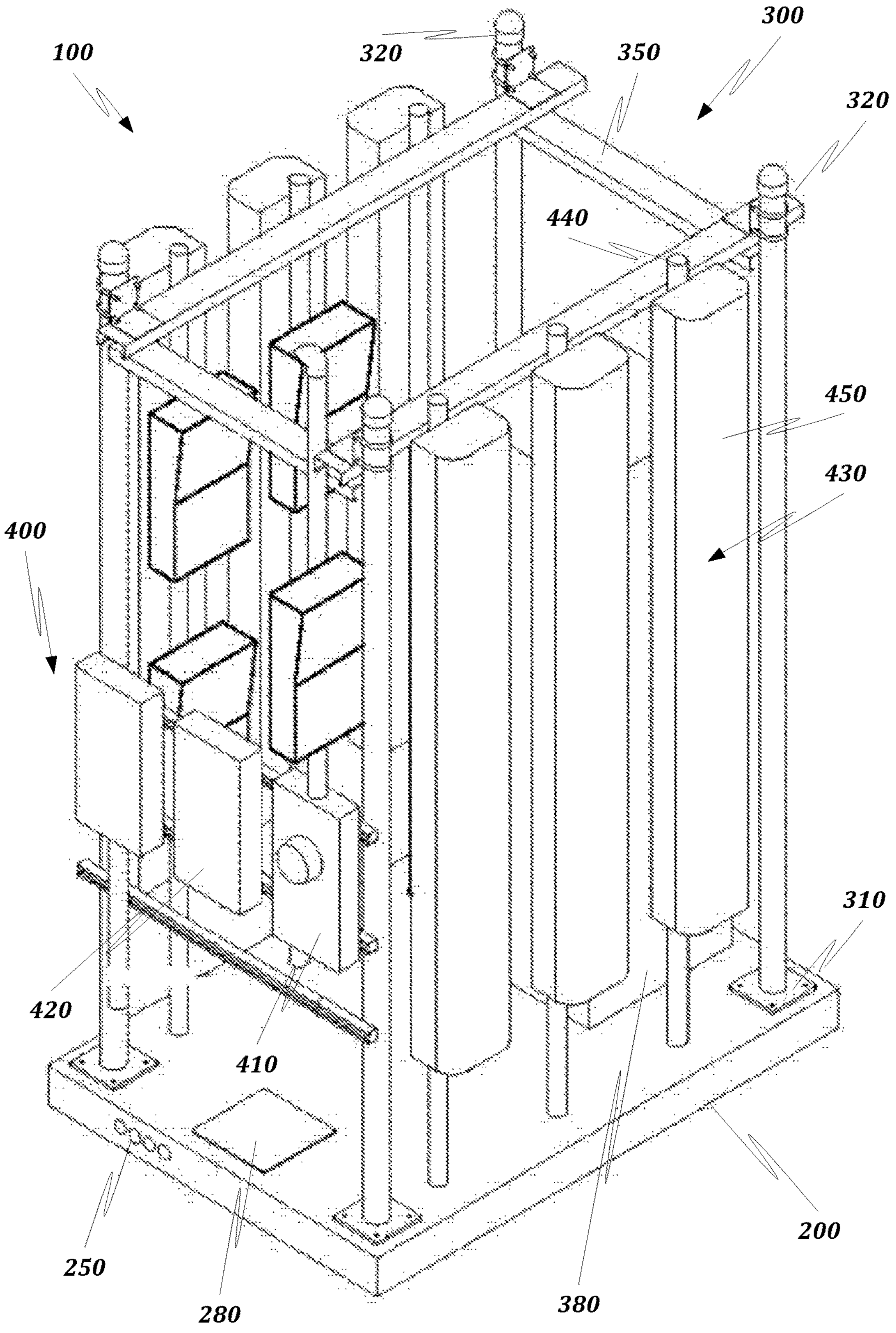
FIG. 4 is a perspective view thereof.
Figure 5:
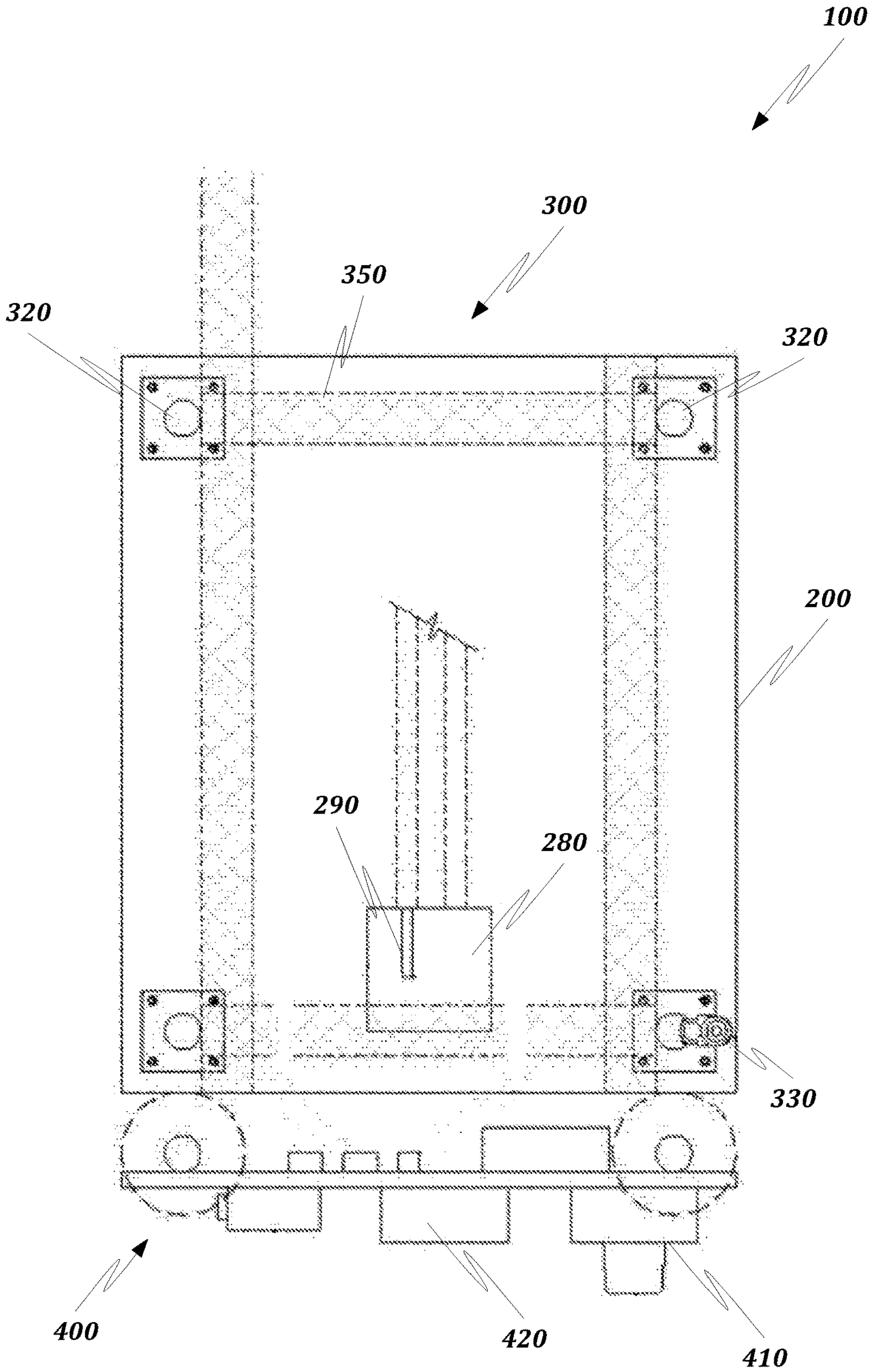
FIG. 5 is a top view thereof.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of cellular network platforms and installation, embodiments of the present disclosure are not limited to use only in this context.

I. APPARATUS OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure may provide a manufactured utility apparatus. The apparatus presents advantages when comparing to the traditional means of creating and/or upgrading cellular towers ("cell sites"). One advantage the apparatus presents is the complete manufacture of a cell site's components, consolidated into a compact manufactured utility apparatus. The apparatus is therefore able to be more easily transported to, and installed on, the intended cell site.

Figure 12:
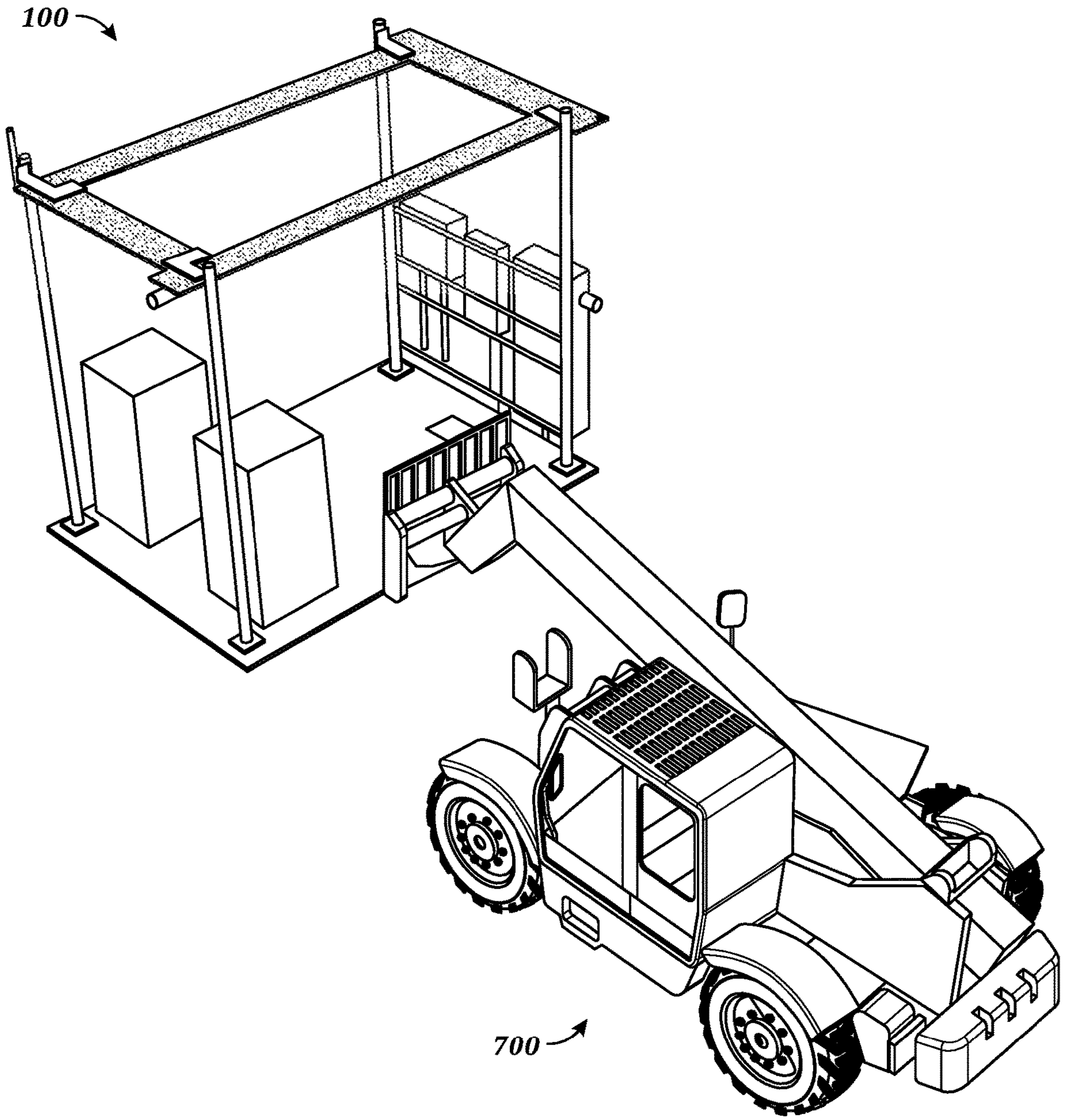
FIG. 12 is a diagram showing a method of installation of the manufactured utility apparatus of FIG. 1.

A reduction and/or elimination of traditional construction at the cell site while being built is further gained from the manufacture of the apparatus prior to being transported to the cell site. For example, various equipment, parts, and machinery needed for a traditional construction build of a cell site is eliminated due to the manufacture of the manufactured utility apparatus prior to construction of the cell site. In some embodiments, the manufactured utility apparatus may be shipped in a pre-assembled format. Installation of the manufactured utility apparatus at a selected site may be effected via placement of the manufactured utility apparatus utilizing a forklift (as depicted in FIG. 12), or other equipment configured to move heavy objects.

Another advantage of the manufactured utility apparatus is the ability for the apparatus to be tested as a cell site prior to being shipped to and/or installed on the actual cell site. This advantage can eliminate much testing required and unforeseen complications if traditionally built onsite.

The plurality of improved attachment and detachment means, making components such as cables, fibers, ice bridges, and/or grounding systems faster and easier to perform, is another advantage of the present disclosure.

A further advantage of the manufactured utility apparatus is the ability for the apparatus to be easily relocated from an already existing and operating cell site, with no interruption of the existing cell site, and minimal interruption of the site where the manufactured utility apparatus is being relocated to.

Embodiments of the present disclosure may comprise methods, systems, platforms, and a computer readable medium.

Accordingly, embodiments of the present disclosure provide a software and hardware platform comprised of a distributed set of hardware elements and computing elements, including, but not limited to:

A. A Base Module;
B. An Ice Bridge Support Module;
C. An Ice Bridge Module;
D. An Equipment Cabinet Module;
E. A Cable Securing Module;
F. A H-Frame Module;
G. An Antenna Module;
H. A Grounding Module;
I. A Computing Device;
J. A Security and Inventory Module;

In some embodiments, the present disclosure may provide an additional set of components for further facilitating the system. The additional set of components may comprise, but not be limited to:

K. A Generator Module;
L. A Wi-Fi Module; and
M. A GPS Antenna.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 600 may be employed in the performance of some or all of the stages disclosed with regard to the methods. Similarly, an apparatus may be employed in the performance of some or all of the stages of the methods. As such, the apparatus may comprise at least those architectural components as found in computing device 600.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the modules disclosed herein. The method may be embodied as, for example, but not limited to, computer instructions, which when executed, perform the method. The method may comprise the following stages:

- Providing a base module comprising:
  - Providing a concrete pad comprising:
    - Providing a pullbox aperture configured for housing a pullbox,
    - Providing a plurality of conduit apertures configured for securing the pullbox,
  - Connecting the pullbox to the pullbox aperture,
  - Providing at least one conduit bushing, and
  - Connecting an SO cord to the pullbox;

Connecting an ice bridge support module to the base module via a plurality of base plates and a plurality of securing means; Providing an ice bridge module comprising:
  Providing at least one ice bridge, and
  Connecting at least one trapeze module, via at least one trapeze securing
  means, to the at least one ice bridge module;
Connecting the ice bridge module to the ice bridge support module;
Connecting a GPS antenna to the ice bridge support module;
Providing an equipment cabinet module comprising;
  Providing an internal housing,
  Securing a Wi-Fi module to the internal housing,
  Securing a battery charging module to the internal housing,
  Securing a server to the internal housing, and
  Securing a security and inventory module to the internal housing,
Connecting an equipment cabinet module to the base plate module;
Providing an H-frame module comprising:
  Providing an H-frame,
  Connecting a utility meter module to the H-frame,
  Connecting a disconnect module to the H-frame, and
  Connecting a slack cabinet to the H-frame module;
Connecting the H-frame module to the base plate module;
Providing an antenna module comprising:
  Providing a plurality of antenna pipes,
  Connecting a plurality of antennas to the plurality of antenna pipes, and
  Connecting a plurality of remote radio units ("RRU") to the plurality of antenna pipes;
Connecting the antenna module, via the plurality of antenna pipes, to the base plate module;
Connecting a cable securing module to the base plate module;
Securing at least one hybrid cable to the cable securing module and/or a combination of individual fiber and power cables in accordance with design engineer;
Providing a grounding module comprising:
  Providing at least one helical grounding anchor,
  Providing at least one splay module, and
  Providing a plurality of grounding wires;
Connecting the grounding module to the base plate module; and
Connecting a generator module to the base plate module.

Although the aforementioned method has been described to be performed by manufactured utility apparatus 100, it should be understood that computing device 600 may be used to perform the various stages of the method. Furthermore, in some embodiments, different operations may be performed by different networked elements in operative communication with computing device 600. For example, a plurality of computing devices may be employed in the performance of some or all of the stages in the aforementioned method. Moreover, a plurality of computing devices may be configured much like a single computing device 600. Similarly, an apparatus may be employed in the performance of some or all stages in the method. The apparatus may also be configured much like computing device 600.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. APPARATUS OVERVIEW

Embodiments of the present disclosure provide a software and hardware platform comprised of a distributed set of components, including, but not limited to:

A. Base Module

FIGS. 1-5 illustrate a manufactured utility apparatus 100 consistent with embodiments of the disclosure. In some embodiments, manufactured utility apparatus 100 may comprise a base module having a pad 200, a plurality of conduit bushings 250, a pullbox 180, and at least one extra hard service oil resistant ("SO") Cord.

As shown in FIG. 12, the manufactured utility apparatus 100 may be shipped to an installation site in a pre-assembled format. Installation of the manufactured utility apparatus 100 at the selected site may be effected by placement of the manufactured utility apparatus at a location near enough to a site to be electrically connected. In some embodiments, placement can occur utilizing equipment 700 configured to move heavy objects, such as a forklift, backhoe, or the like.

I. Pad

Figure 6:
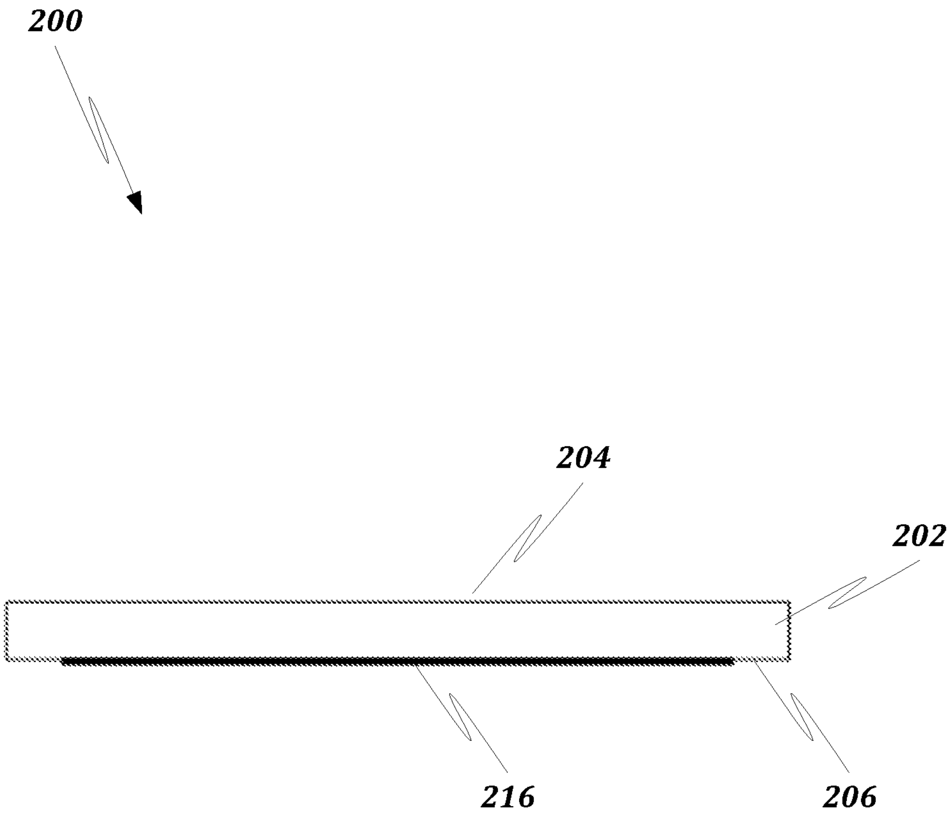
FIG. 6 illustrates a side view of a precast pad for use with the manufactured utility apparatus of FIG. 1.

As shown in FIG. 6, the pad 200 may include one or more precast ground pads 202 formed from a rigid, insulating material. As a particular example, the precast ground pad 202 may be formed from concrete or similar. Each precast ground pad 202 may have a footprint. In some embodiments, the footprint may be symmetric about one or more axes of symmetry. For example, the pad 202 may be square, rectangular, circular, or the like. In other embodiments, the footprint may be asymmetric.

One or more (e.g., each) of the one or more precast ground pads 202 may comprise an upper surface 204, a lower surface 206, and one or more holes 208. In some embodiments, the pad 200 may comprise a plurality of edges.

Figure 7:
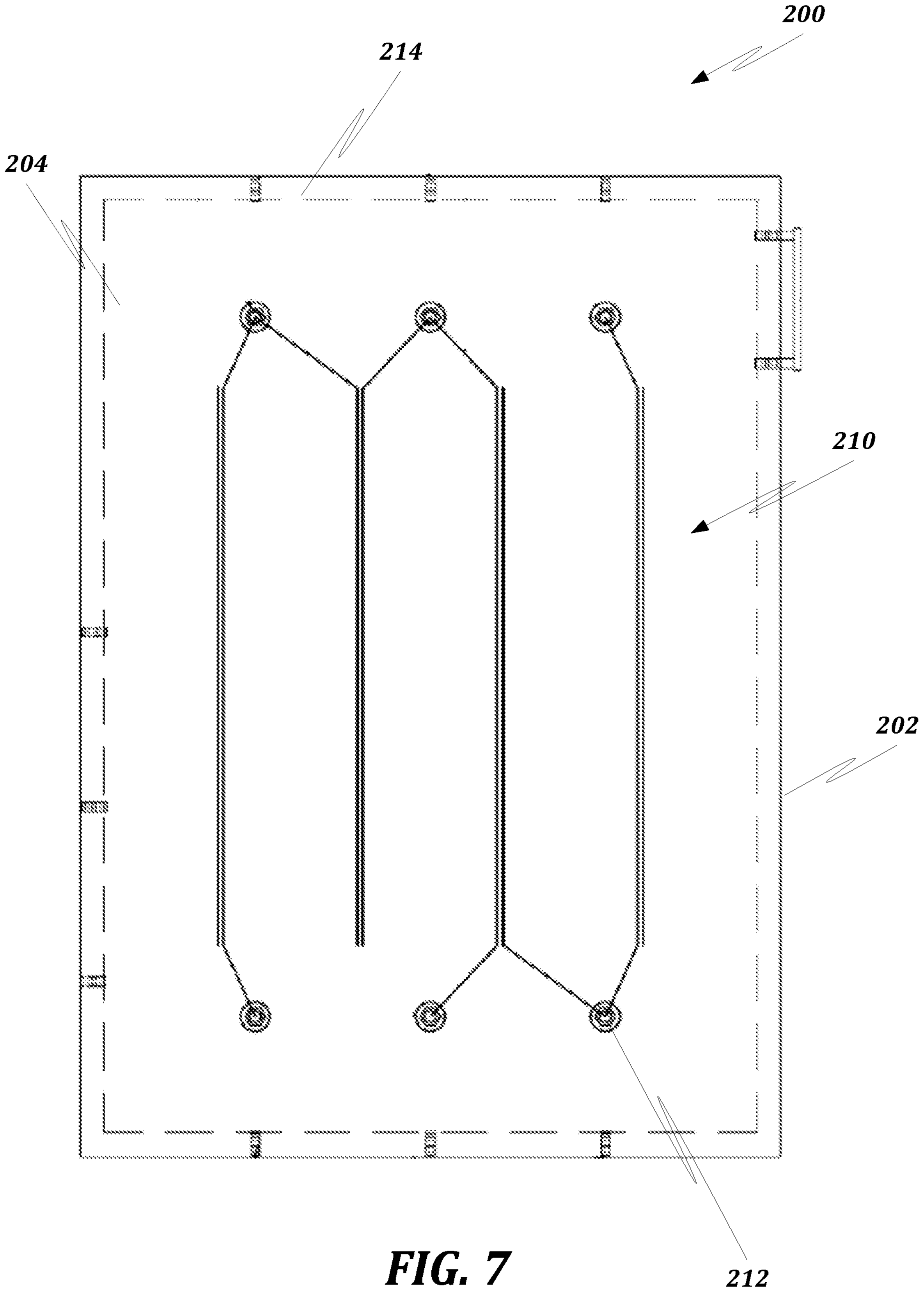
FIG. 7 is a top view of the precast pad.

As shown in FIG. 7, the pad upper surface 204 is preferably a substantially planar surface. The shape of the pad upper surface 204 preferably corresponds to the pad footprint. In some embodiments, the pad upper surface 204 may include a railing layout 210. The railing layout 210 may include one or more rails providing an electrical connection to the base module. The one or more rails may be dimensioned to be compatible with one or more structures. For example, the railing layout may be universally compatible with one or more (e.g., multiple) structures that may be mounted or otherwise installed onto the rails. In embodiments, the one or more structures may be moved about the pad 200 along the one or more rails, such that the structure mounted to the railing remains electrically connected to the base module. In some embodiments, the railing may serve as at least one anchor point for a hydraulic ram frame.

The pad lower surface 206 is preferably a substantially planar surface. The shape of the pad lower surface 206 preferably corresponds to the shape of the pad upper surface 204 (e.g., the shape of the pad lower surface 206 is preferably substantially identical to the shape of the pad upper surface 204). In embodiments, the pad lower surface 206 may be substantially parallel to the pad upper surface 204.

In embodiments, the ground pad 202 may include one or more holes 212. The one or more holes 212 may be arranged in a particular hole pattern. The hole pattern may define a location and/or size for each of the one or more holes 212. In some embodiments, the hole pattern is configured to interconnect with an electrical ground plane pattern. In some embodiments, one or more (e.g., each) of the one or more holes 212 may extend substantially perpendicularly from the pad upper surface 204 through the thickness of the ground pad 200 to the pad lower surface 206. At least one of the one or more holes 212 may have a circular cross-sectional shape. In some embodiments, at least one of the one or more holes 212 may be used as an anchor point for a hydraulic ram frame.

In some embodiments, the ground pad assembly 202 may include a middle conductive layer 214. The middle conductive layer 214 may be formed as a substantially continuous sheet of conductive material embedded within the ground pad assembly 202. The middle conductive layer 214 may be disposed away from both the pad upper surface 204 and the pad lower surface 206.

Figure 8A:
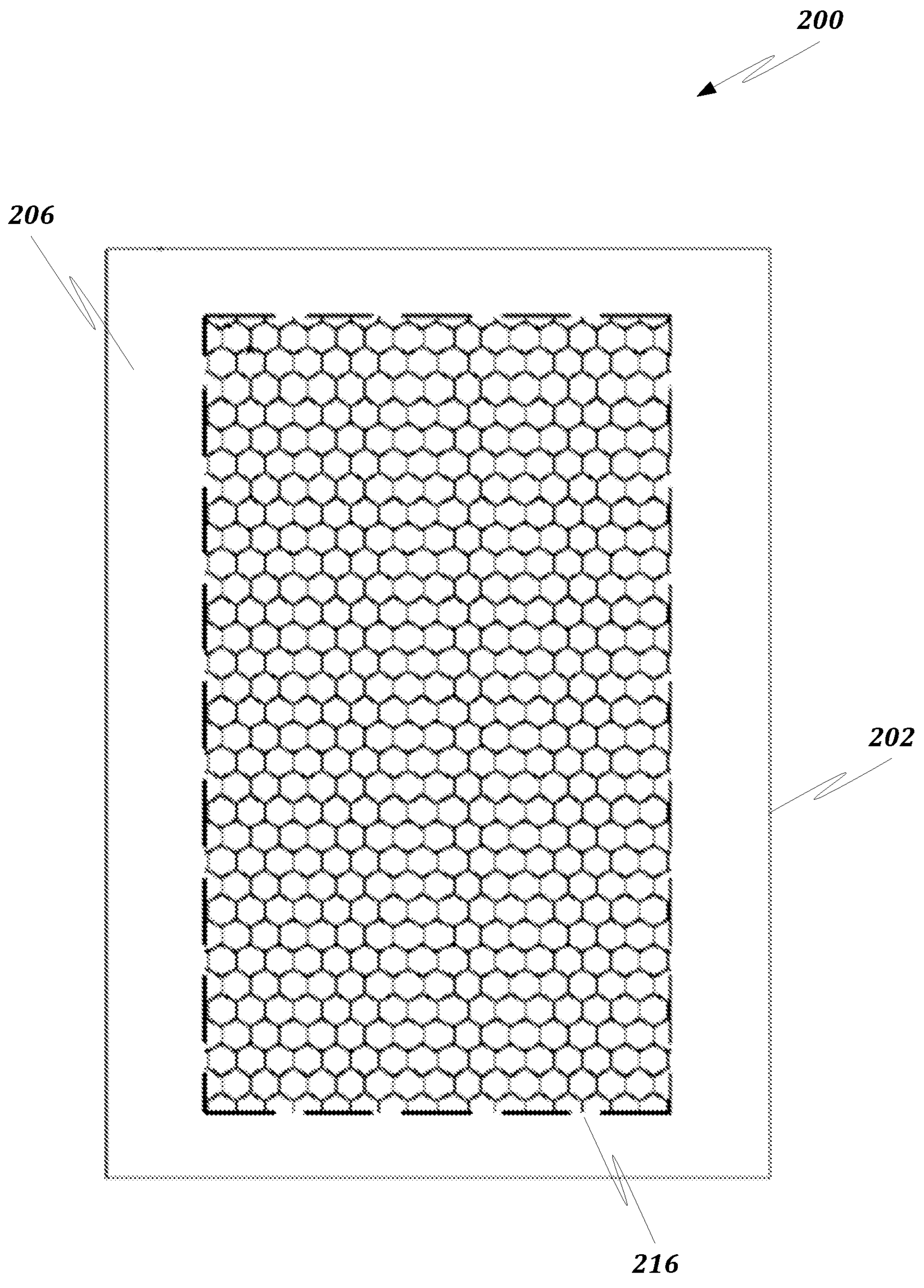
FIGS. 8A-8C are bottom views of various embodiments of the precast pad.
Figure 8B:
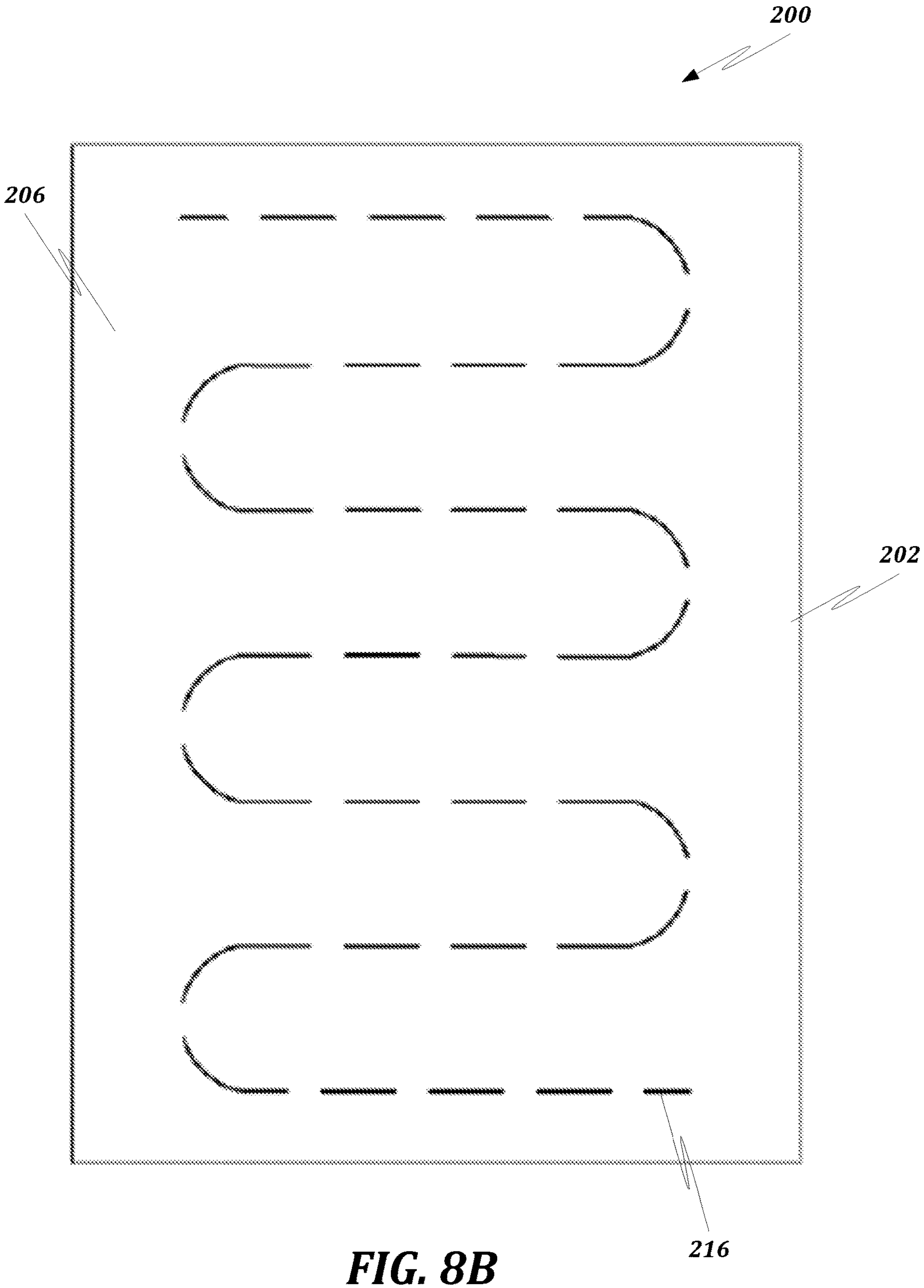
Figure 8C:
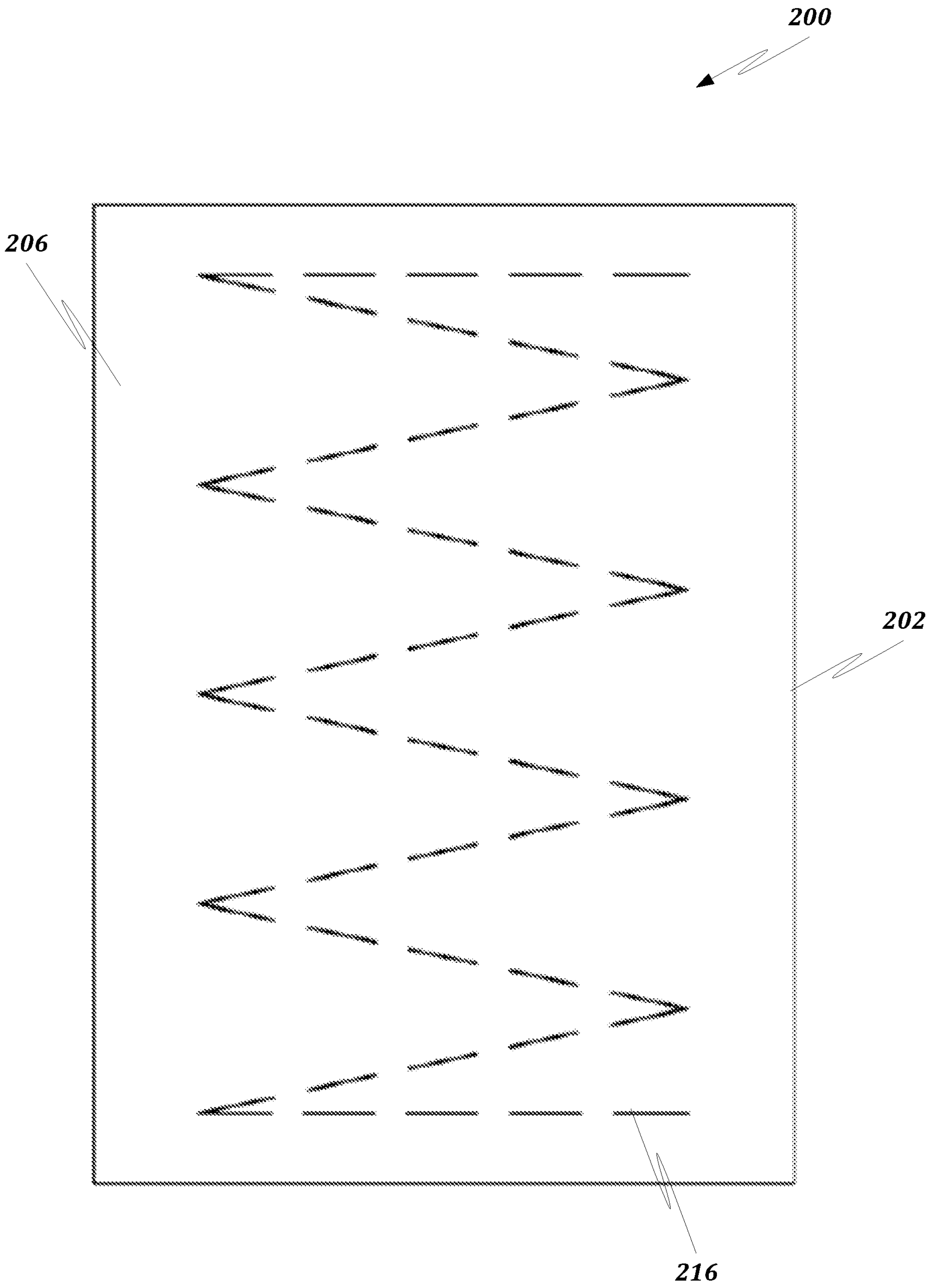

In some embodiments, the ground pad assembly 202 may include an electrically conductive underlayer 216. The electrically conductive underlayer 216 may include a ground plane pattern having a lower surface and an upper surface. The upper surface of the electrically conductive underlayer 216 may be attached to the precast ground pad assembly 202, For example, the upper surface may be fixed to the ground pad lower surface 206, or embedded within the ground pad assembly 202. The lower surface of the electrically conductive underlayer 216 may form various patterns, as illustrated in FIGS. 8A-8C. For example, the pattern may be a mesh pattern (FIG. 8A), a serpentine pattern (FIG. 8B), or a zig-zag pattern (FIG. 8C). As discussed above, the pattern may include holes configured to interconnect with one or more of the holes 212. Accordingly, the pattern may include one or more holes 218 which correspond to the one or more holes 212. An internal diameter of the one or more holes 218 in the mesh may be less than a diameter of a conductive insert (e.g., a sleeve, a bolt, a wire, etc.), such that a conductive insert, when inserted in the hole 212, passes through and contacts the hole 218 in the pattern. In embodiments, the pattern may be fabricated from a monolithic conductive plate or an array of conductive plates. In embodiments, the pattern may be formed from the conductive plates using one or more techniques, including punching, stamping, die cutting, electrical discharge machining, laser cutting or etching, water jet machining, etc. There are many techniques which may be used to fabricate the pattern.

In some embodiments, the pattern may be a mesh pattern. The mesh pattern may be circular, ellipsoid, n-sided polygonal (e.g. triangle, square, pentagonal, etc.), symmetric, asymmetric, or a combination of any of the above. The mesh pattern may be characterized by an interlaced structure having points of overlap that are electrically connected. In other embodiments, the pattern may be a serpentine pattern characterized by a series of curves. In still other embodiments, the pattern may be a zig-zag pattern characterized by a short, sharp series of turns or angles. In still other embodiments, the pattern may comprise a combination of a mesh, a serpentine, and/or a zig-zag pattern.

Figure 9:
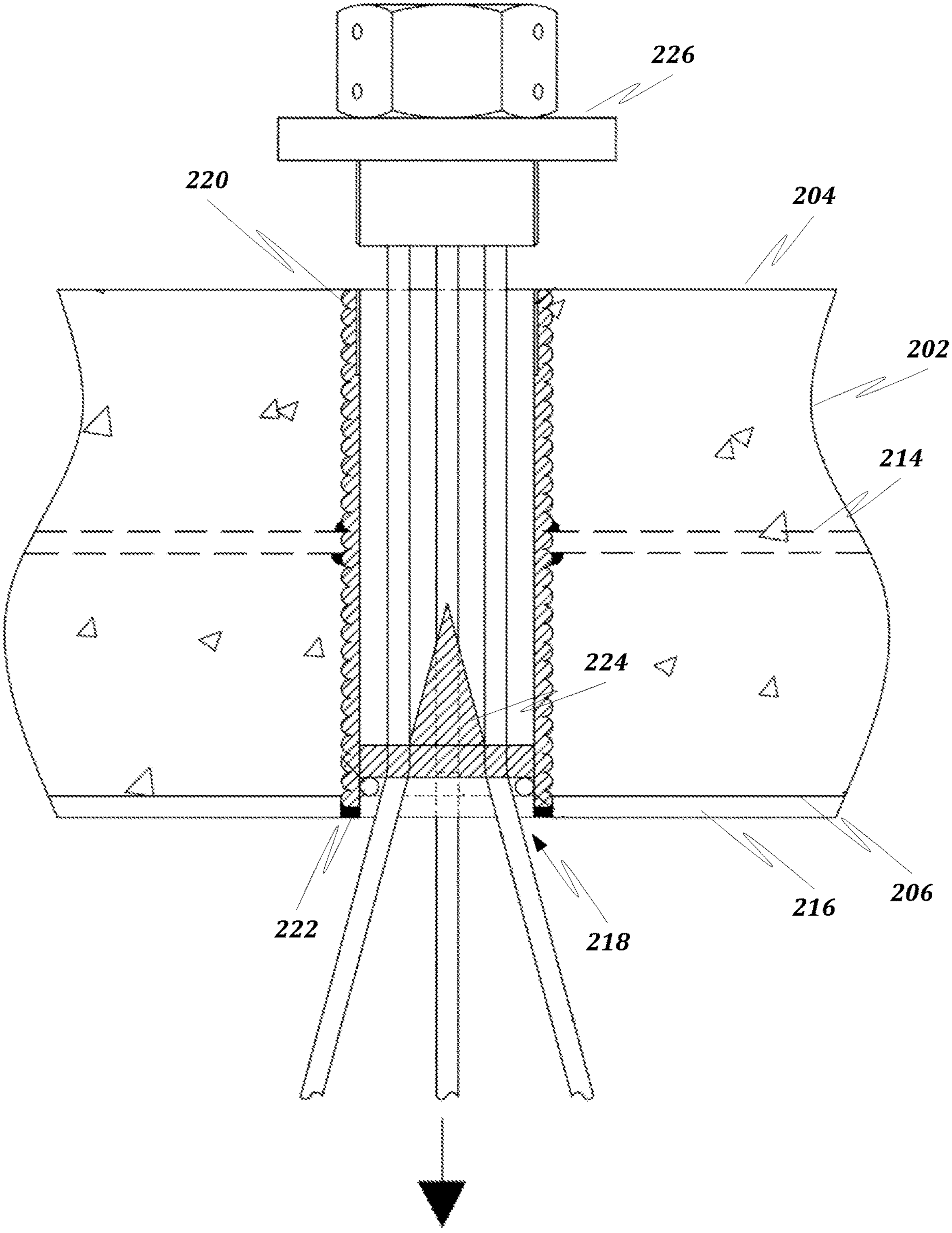
FIG. 9 is a first cutaway view of the precast pad.

As illustrated in FIG. 9, the ground plane pattern may include one or more threaded electrical grounding key inserts 220. One or more (e.g., each) of the threaded electrical grounding key inserts 220 may be fixedly inserted into a corresponding hole. The threaded electrical grounding key inserts 220 may be sized to receive a corresponding insert, such as a threaded electrical grounding bolt and/or a smooth sleeve. In some embodiments, one or more (e.g., each) of the threaded electrical grounding key inserts 220 may have a circular cross section. The threaded electrical grounding key inserts 220 may be electrically connected to the electrically conductive underlayer and/or to the middle conductive layer In embodiments, the ground plane pattern may include one or more stopper beads 222. One or more (e.g., each) of the stopper beads 222 may be permanently attached to the lower surface of ground plane pattern 216. One or more (e.g., each) of the stopper beads 222 may be formed as a continuous ring of a conductive material. One or more (e.g., each) of the stopper beads 222 may be located concentrically with each of the holes 218. The stopper beads 222 may have a radius that is slightly less than the internal radius of the threaded electrical grounding key inserts 220. Accordingly, one or more (e.g., each) of the stopper beads 222 may help to prevent threaded electrical grounding bolts from being threaded too far into the threaded electrical grounding key inserts 220.

The ground plane pattern may include one or more distribution cones 224. Each distribution cone 224 may be disposed at the lower surface of ground plane pattern 216. In some embodiments, one or more of the distribution cones 224 may be permanently attached to the lower surface of the ground plane pattern 216. In some embodiments, one or more of the distribution cones 224 may be removably attached or otherwise removably in contact with the lower surface of the ground plane pattern 216. One or more (e.g., each) of the distribution cones 224 may be placed on a stopper bead 222. In some embodiments, the distribution cones 224 may be formed as a right circular cone having a diameter approximately equal to the internal radius of a threaded electrical grounding key insert 220.

In some embodiments, the ground pad assembly 202 may include one or more threaded electrical grounding bolts 226 comprising a nut and a plurality of grounding connectors. Each of the one or more threaded electrical grounding bolts 226 may be screwed or otherwise driven into a corresponding threaded electrical grounding key insert 220 and advanced until a corresponding distribution cone 224 interfaces with the plurality of grounding connectors, forcing them apart as they enter the earth. In some embodiments, the nut portion of the electrical grounding bolt 226 comprises a split nut. In other embodiments, the nut comprises a compressed nut. The nut may be electrically connected to an integral washer such that the washer and the nut are substantially concentric. The integral washer may have an outer diameter that is larger than a corresponding hole (e.g., a hole 212, 218).

In some embodiments, the threaded electrical grounding bolts 226 include a plurality of grounding connectors formed as one or more grounding wires and/or one or more grounding rods. One or more (e.g., each) of the grounding connectors may extend perpendicularly from the base of the nut (e.g., the split nut or the compressed nut). In embodiments, the grounding connectors may have a length substantially greater than the thickness of the precast concrete ground pad 202. For example, the length of each of the grounding connectors may be on the order of 3-4 feet. One or more (e.g., each) of the grounding connectors may be electrically conductive and sufficiently stiff to allow the grounding connector to penetrate earth beneath the precast ground pad assembly. In some embodiments, the grounding connectors may have a pointed, beveled or otherwise sharp tip to facilitate penetration into the earth. In some embodiments, the grounding connectors may be formed from, for example, steel-clad copper, an electrically conductive graphite or carbon composite material, a different conductive composite material, and/or a gold clad steel.

Figure 10:
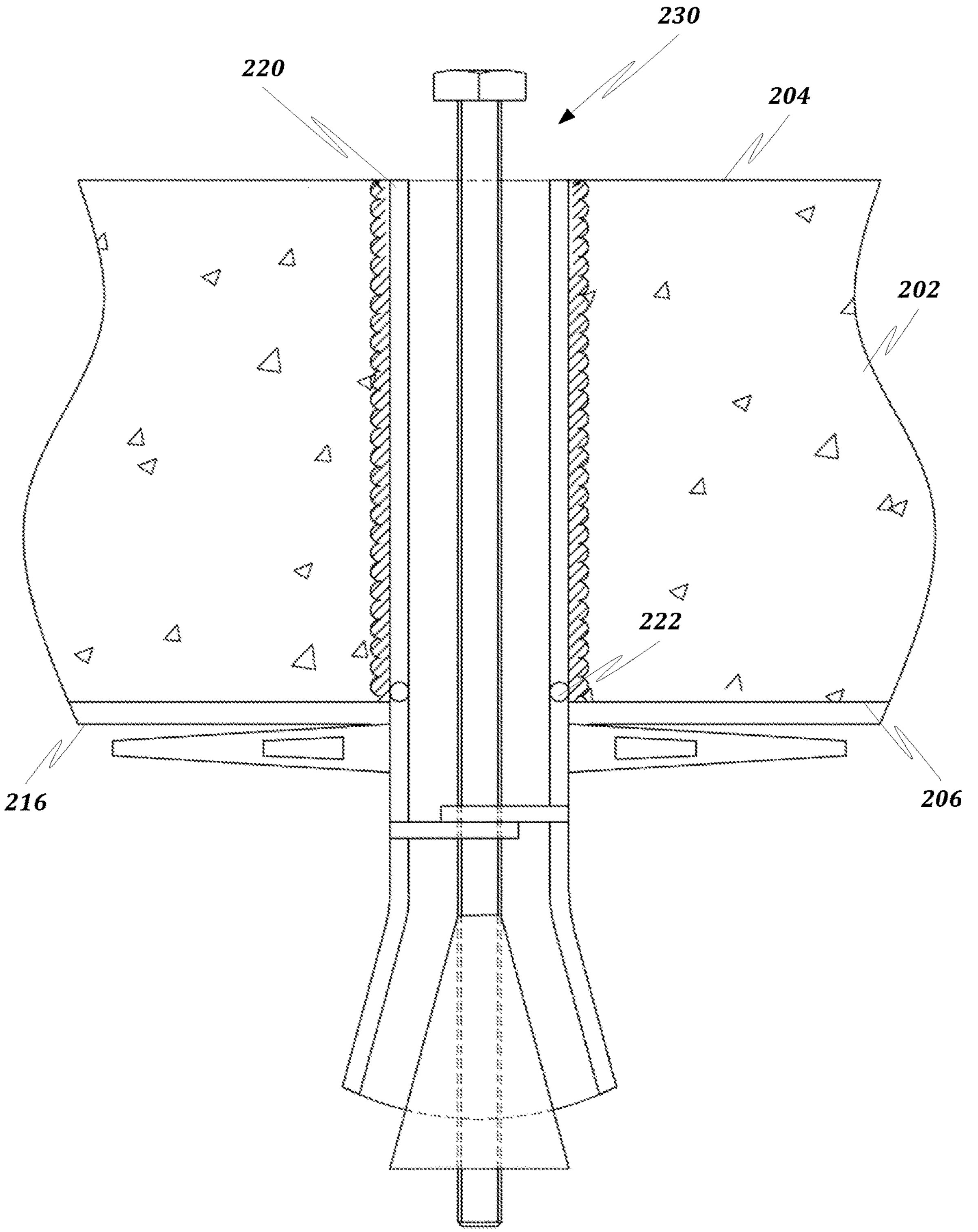
FIG. 10 is a second cutaway view of the precast pad.
Figure 11:
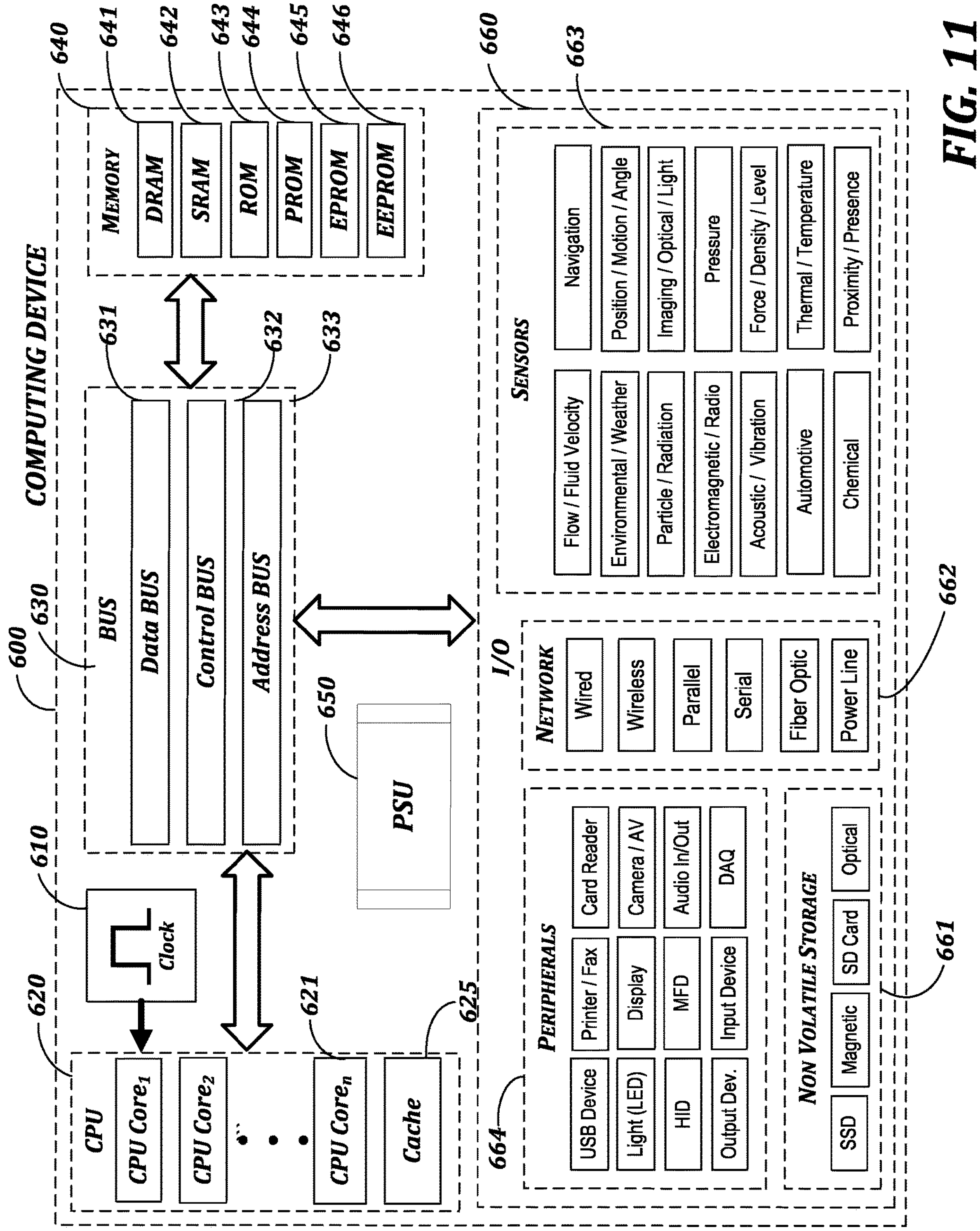
FIG. 11 is a block diagram of a system including a computing device for performing, at least in part, the platforms, systems, and methods of the present disclosure.

As shown in FIG. 10, in some embodiments, the ground pad assembly 202 may include one or more grounding anchor bolt assembly 230. The grounding anchor bolt assembly 230 may include a hex head threaded tension bolt and a collapsible conductive wing assembly. The collapsible conductive wing assembly may extend substantially perpendicular to a major axis of the grounding anchor bolt assembly 230 when not constrained (e.g., when under tension from the interior bolt). In some embodiments, the collapsible conductive wing assembly may fold such that wings of the wing assembly are substantially coaxial with the major axis of the grounding anchor bolt assembly. The grounding anchor bolt assembly 230 may include a sheath. The sheath may include at least one longitudinal segment that coaxially surrounds at least a portion of the hex head threaded tension bolt. In some embodiments, the sheath may include three or more longitudinal segments. The grounding anchor bolt assembly may include a spreading cone that threadedly interfaces with a distal end of the hex head threaded tension bolt and advances axially toward the hex head threaded tension bolt upon rotation of the hex head threaded tension bolt, causing spreading of the sheath.

The precast ground pad assembly 202 may include a system of one or more embedded holes and connectors configured to connect the internal and/or bottom surface grounding planes to an external grounding bar.

In some embodiments, the pad may comprise at least one pullbox aperture. In yet some embodiments, pad may comprise a plurality of conduit apertures. The plurality of conduit apertures may be used to secure pull box.

II. Conduit Bushing

In some embodiments, the at least one conduit bushing 250 may connect to the plurality of conduit apertures. The conduit bushing 250 may be used to provide a smooth surface for pulling and/or guiding wires.

III. Pullbox

In some embodiments, the pull box 280 may be secured in a pullbox aperture. The pull box 280 may be used as an accessibility point to facilitate the pulling of wires and/or cables.

IV. SO Cord

In some embodiments, the SO cord 290 may comprise at least one conductor cord. In some embodiments, the SO cord 290 may comprise at least one conductor cable. In still other embodiments, the SO cord 290 may comprise at least one power means. By way of nonlimiting example, the power means may be a power plug, a receptacle, and/or a twist lock connector. In embodiments, the SO cord 290 may comprise an external housing. By way of nonlimiting example, the external housing may be formed from thermoplastic, rubber, elastomer, plastic, and/or insulating fiber. In some embodiments, the SO cord 290 may be connected and connection secured by a plurality of connecting means.

In even further embodiments, the SO cord 290 may connect to the pullbox 280. The SO cord 290 connecting to the pullbox 280 may be used as a waterproof quick connect location. In some embodiments, the quick connect may include a main service cabinet with a branch breaker.

B. Ice Bridge Support Module

FIG. 1 illustrates an ice bridge support module 300 consistent with embodiments of the disclosure. In some embodiments, the ice bridge support module may comprise a plurality of base plates. In some embodiments, the plurality of base plates may comprise a plurality of securing means 310. The plurality of securing means 310 may be used to connect the plurality of base plates to the base module.

In further embodiments, the ice bridge support module may comprise a plurality of ice bridge supports 320. In some embodiments, the plurality of ice bridge supports may connect to the base plate. The plurality of ice bridge supports may be used to secure a plurality of ice bridge modules. In some embodiments, the ice bridge support may connect to a GPS antenna 330.

C. Ice Bridge Module

FIG. 1 illustrates the ice bridge module 350 consistent with embodiments of the disclosure. In some embodiments, the ice bridge module may comprise a plurality of ice bridges. The ice bridge module 350 may comprise a support structure configured to horizontally secure transmission lines from the tower to the manufactured utility apparatus 100.

In some embodiments, the ice bridge module may comprise a trapeze module 360. In some embodiments, the trapeze module may comprise a plurality of brackets. The plurality of brackets may be used to guide wires, cords, and/or cables. In further embodiments, the trapeze module may comprise a plurality of trapeze securing means 370. The trapeze securing means 370 may be used to connect the trapeze module 360 to the ice bridge module. The trapeze securing means may be further used to secure wires, cords, and/or cables.

D. Equipment Cabinet Module

FIG. 1 illustrates an equipment cabinet module 380 consistent with embodiments of the disclosure. In some embodiments, the equipment cabinet module 380 may comprise a battery charging module. In further embodiments, the equipment cabinet module 380 may be configured to house a plurality of electrical, utility, telecom, or wireless technology equipment. In even further embodiments, the equipment cabinet module 380 may comprise a Wi-Fi module. In yet further embodiments, the equipment cabinet module 380 may comprise at least one antenna. In still further embodiments, the equipment cabinet module 380 may comprise at least one server (e.g., a computer 600).

E. Cable Securing Module

FIG. 1 illustrates a cable securing module 390 consistent with embodiments of the disclosure. In some embodiments, the cable securing module 390 may be configured to house at least one hybrid cable. Additionally or alternatively, the cable securing module 390 may be configured to house a combination of individual fiber and power cables in accordance with design engineer. In some embodiments, the cable securing module 390 may be configured to connect to the base module. By way of nonlimiting example, the cable securing module 390 may be a hybrid cable spool.

F. H-Frame Module

FIG. 1 illustrates a H-frame module 400 consistent with embodiments of the disclosure. In some embodiments, the H-frame module may comprise a utility meter module 410. By way of nonlimiting example, the utility meter module 410 may be an electromechanical meter, an automated ("smart") meter, and/or a bi-directional meter. The utility meter module 410 may be used to monitor and/or record the total amount of power consumed by manufactured utility apparatus 100.

In further embodiments, the H-frame module 400 may comprise a disconnect module 420. The disconnect module 420 may be used to isolate some or all of the wiring in the manufactured utility apparatus 100 from the source of power. The disconnect module 420 may be further used to isolate some or all of the wiring leading to a distribution panel. In some embodiments, the disconnect module 420 may comprise at least one switch. The at least one switch may be used to connect or disconnect all or some of the power from the manufactured utility apparatus 100. In embodiments, the disconnect module 420 may be used as a quick connect, allowing for a high-amperage quick connection. For example, the high amperage quick connect may allow for a 100-200 Amp connection.

In yet further embodiments, the H-frame module may comprise a slack cabinet. The panel module may be used for aggregating and/or adjusting all or some of the cables, cords, and wires of manufactured utility apparatus 100, the equivalence of units generically known as a "company switch."

G. Antenna Module

FIG. 1 illustrates an antenna module 430 consistent with embodiments of the disclosure. The antenna module 430 may be used for 5G connectivity and/or distribution. In some embodiments, the antenna module 430 may comprise a plurality of antenna pipes 440. In some embodiments, the antenna pipe 440 may connect to the base module. The plurality of antenna pipes 440 may be used for temporarily securing a plurality of antennas while being transported from the manufacturing site to the cell site.

In further embodiments, the antenna module 430 may comprise the plurality of antennas 450. The plurality of antennas 450 may be used to act as a transceiver.

In further embodiments, the antenna module 430 may comprise a plurality of Remote Radio Units 460 ("RRU"). The plurality of remote radio units 460 may be used to control and process the EM signals received from the antenna. The plurality of remote radio units 460 may be used to provide back-to-back support and connectivity between modules and manufactured utility apparatus 100. The plurality of remote radio units 460 may be used to connect to an operator radio control panel via electrical or wireless interface. In some embodiments, the plurality of remote radio units 460 may comprise at least one CPRI port. In further embodiments, the plurality of remote radio units 460 may comprise at least one RF port. In further embodiments, the plurality of remote radio units 460 may comprise at least one RET port. In further embodiments, the plurality of remote radio units 460 may comprise at least one power supply port. In further embodiments, the plurality of remote radio units 460 may comprise at least one ground port.

H. Grounding Module

FIG. 1 illustrates a grounding module 470 consistent with embodiments of the disclosure. In some embodiments, grounding module 470 may comprise a plurality of ground leads 480.

In further embodiments, grounding module may comprise a helical grounding anchor. In some embodiments, the helical grounding anchor may comprise a pipe. In some embodiments, the pipe may be embodied as, for example, an Outside Diameter, ("OD") schedule 40 steel pipe. In some embodiments, the pipe may comprise a plurality of apertures. In some embodiments, the plurality of apertures may be embodied as, for example, three quarter inch distribution holes drilled every three inches sequentially in a vertical manner. The plurality of apertures may be used to distribute a ground chemical as the helical grounding anchor is driven into the ground.

In some embodiments, the helical anchor may comprise a spiral plate. In some embodiments, the spiral plate may be welded on to the pipe. In further embodiments, the spiral plate may be created, for example, by bending a steel plate at a 15-degree upper curve structural onside-bending. In some embodiments, the steel plate may have a plurality of dimensions such as, for example, 6" by 5⁄32".

In further embodiments, the grounding module may comprise a splay module. In some embodiments, the splay module may comprise an insertion pipe. The insertion pipe may be used to feed a plurality of grounding wires into the ground. The plurality of ground wires may be embodied as, for example, a plurality of #2 copper wires 30 feet in length. In further embodiments, the splay module may comprise an organizational manifold. The organizational manifold may be used to house the plurality of grounding wires prior to being inserted into the ground. In yet further embodiments, the splay module may comprise a core pipe. The core pipe may be used to be inserted into the ground after a hole has been drilled into the ground. In some embodiments, the core pipe may comprise at least one pipe joint ("mushroom head"). The at least one pipe joint may be used to direct, deflect, and/or bend the plurality of grounding wires. In still further embodiments, the splay module may comprise a plurality of mechanical lug downs. In still further embodiments, the splay module may comprise a plurality of cadweld shots.

In some embodiments, the splay module and/or components of the splay module may be deployed by using at least one of the following: a hydraulic cylinder, a vertical rail hydraulic motor, a hydraulic reservoir, a plurality of hydraulic hoses, a push manifold, and a plurality of drills.

I. Computing Device

FIG. 6 illustrates computing device 600 consistent with embodiments of the disclosure. The computing device architecture will be further disclosed later in the application.

J. Security and Inventory Module

FIG. 1 illustrates a security and inventory module consistent with embodiments of the disclosure. In some embodiments, the security and inventory module may comprise a plurality of unique identifications ("ID"). In some embodiments, the plurality unique ID's may be assigned to the manufactured utility apparatus and/or various modules of the apparatus. The plurality of unique ID's may be embodied as, for example, RFID chips.

In further embodiments, the security and inventory module may comprise a reader. In some embodiments, the reader may be connected to a network such as, for example, Wi-Fi, satellite, radio antenna, and/or broadband antenna. The reader may be used to track and/or upload inventory data to a database. The reader may be used to track and/or upload data relating to the unique IDs to a database. In some embodiments, the database may be locally or remotely accessible. In further embodiments, the database may embody the form of part, or all of a computing device. In some embodiments, the reader may be powered locally by, for example, a power source located in the equipment cabinet module.

In yet further embodiments, the security and inventory module may comprise a security fence. The security fence may be used to trigger a notification and/or alarm upon unexpected inventory changes.

K. Generator Module

FIG. 1 illustrates a generator module consistent with embodiments of the disclosure. In some embodiments, the generator module may comprise at least one generator. The generator module may be used power a cell site while the manufactured utility apparatus is deployed on the cell site. The generator module may be further used as a backup generator.

L. Wi-Fi Module

FIG. 1 illustrates a Wi-Fi module consistent with embodiments of the disclosure. In some embodiments, the Wi-Fi module may create a unique hotspot for the manufactured utility apparatus. In further embodiments, the Wi-Fi module may be housed in the cabinet module. In yet further embodiments, the Wi-Fi module may comprise at least one Wi-Fi antenna. In still further embodiments, the at least one Wi-Fi antenna may be configured to connect to a portion of the ice bridge module.

M. GPS Antenna

FIG. 1 illustrates a GPS antenna consistent with embodiments of the disclosure. The GPS antenna may be used for location and identification purposes of the cell site. In some embodiments, the GPS antenna may be configured to connect to a portion of the ice bridge module.

III. APPARATUS OPERATION

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 600 may be employed in the performance of some or all of the stages disclosed with regard to the methods. Similarly, an apparatus may be employed in the performance of some or all of the stages of the methods. As such, the apparatus may comprise at least those architectural components as found in computing device 600.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

A. Method for Assembling a Manufactured Utility Apparatus

Figure 13:
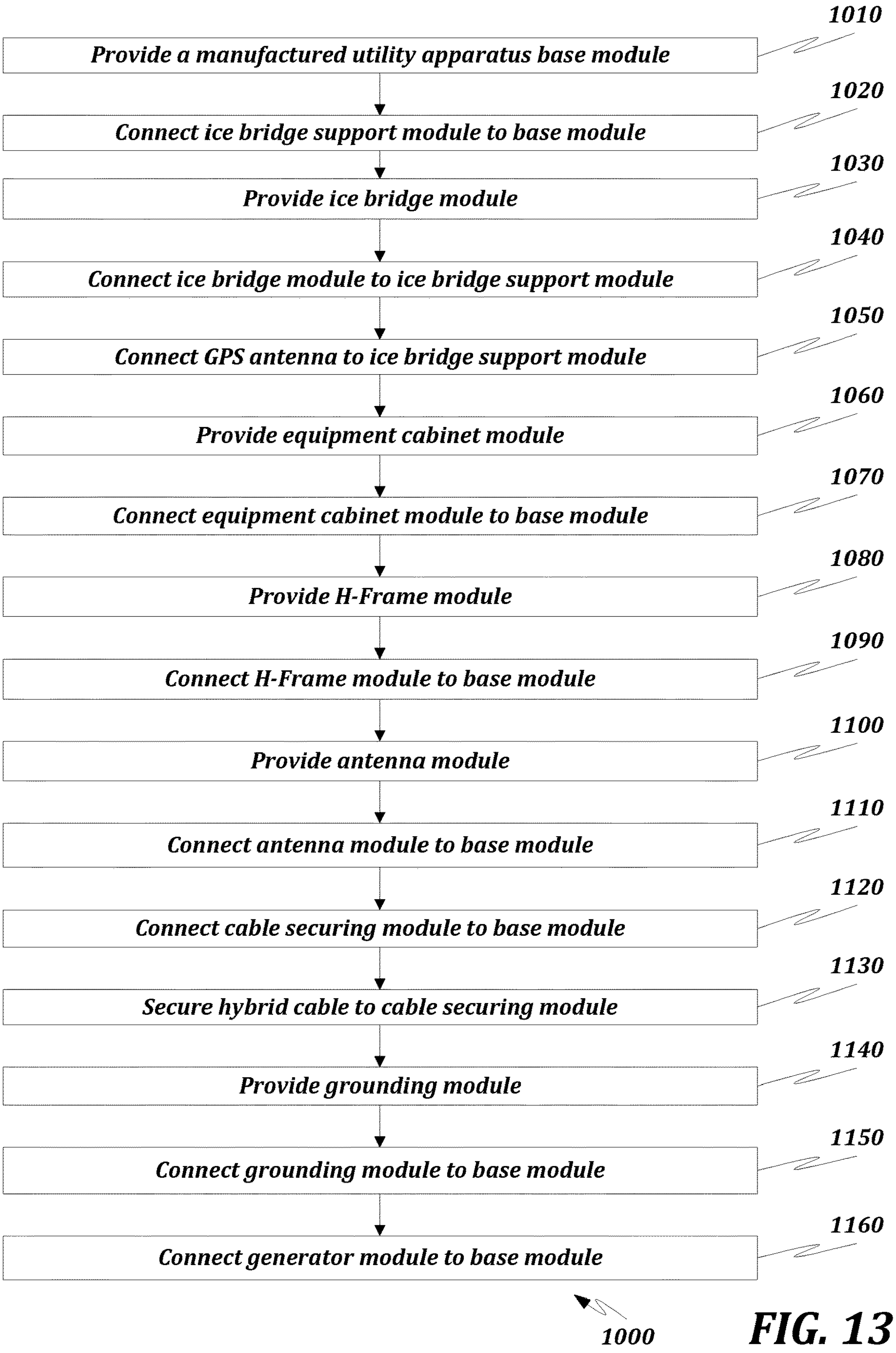
FIG. 13 illustrates a flowchart describing a first method for providing the manufactured utility apparatus.

Consistent with embodiments of the present disclosure, FIG. 13 shows a method 1000 for assembling a manufactured utility apparatus. The method 1000 may be embodied as, for example, but not limited to, assembly instructions and/or operations, which when executed, perform the method. One or more operations of method 1000 may be modified, rearranged, or omitted all together. Accordingly, the particular sequence of operations illustrated in FIG. 12 should not be construed as limiting the scope of one or more embodiments. The method 1000 may comprise the following stages:

1010—Providing a base module comprising:
- a. Providing a pad formed from a rigid insulating material (e.g., concrete, plastic, fiberglass, composite, steel, aluminum, rubber (e.g., reconstituted tires), carbon fiber, and/or combinations thereof) comprising
  - i. Providing a pullbox aperture configured for housing a pullbox
  - ii. Providing a plurality of conduit apertures configured for securing the pullbox
- b. Connecting the pullbox to the pullbox aperture
- c. Providing at least one conduit bushing
- d. Connecting an SO cord to the pullbox

1020—Connecting an ice bridge support module to the base module via a plurality of base plates and a plurality of securing means

1030—Providing an ice bridge module comprising:
- a. Providing at least one ice bridge
- b. Connecting at least one trapeze module, via at least one trapeze securing means, to the at least one ice bridge module

1040—Connecting the ice bridge module to the ice bridge support module

1050—Connecting a GPS antenna to the ice bridge support module

1060—Providing an equipment cabinet module comprising:
- a. Providing an internal housing
- b. Securing a Wi-Fi module to the internal housing
- c. Securing a battery charging module to the internal housing
- d. Securing a server to the internal housing
- e. Securing a security and inventory module to the internal housing

1070—Connecting an equipment cabinet module to the base plate module

1080—Providing an H-frame module comprising:
- a. Providing an H-frame
- b. Connecting a utility meter module to the H-frame
- c. Connecting a disconnect module to the H-frame
- d. Connecting a slack cabinet to the H-frame module

1090—Connecting the H-frame module to the base plate module

1100—Providing an antenna module comprising:
- a. Providing a plurality of antenna pipes
- b. Connecting a plurality of antennas to the plurality of antenna pipes
- c. Connecting a plurality of remote radio units ("RRU") to the plurality of antenna pipes

1110—Connecting the antenna module, via the plurality of antenna pipes, to the base plate module

1120—Connecting a cable securing module to the base plate module

1130—Securing at least one hybrid cable to the cable securing module

1140—Providing a grounding module comprising:
- a. Providing at least one helical grounding anchor
- b. Providing at least one splay module
- c. Providing a plurality of grounding wires

1150—Connecting the grounding module to the base plate module

1160—Connecting a generator module to the base plate module

B. Method for Attaching a Manufactured Utility Apparatus to a Cellular Tower

Figure 14:
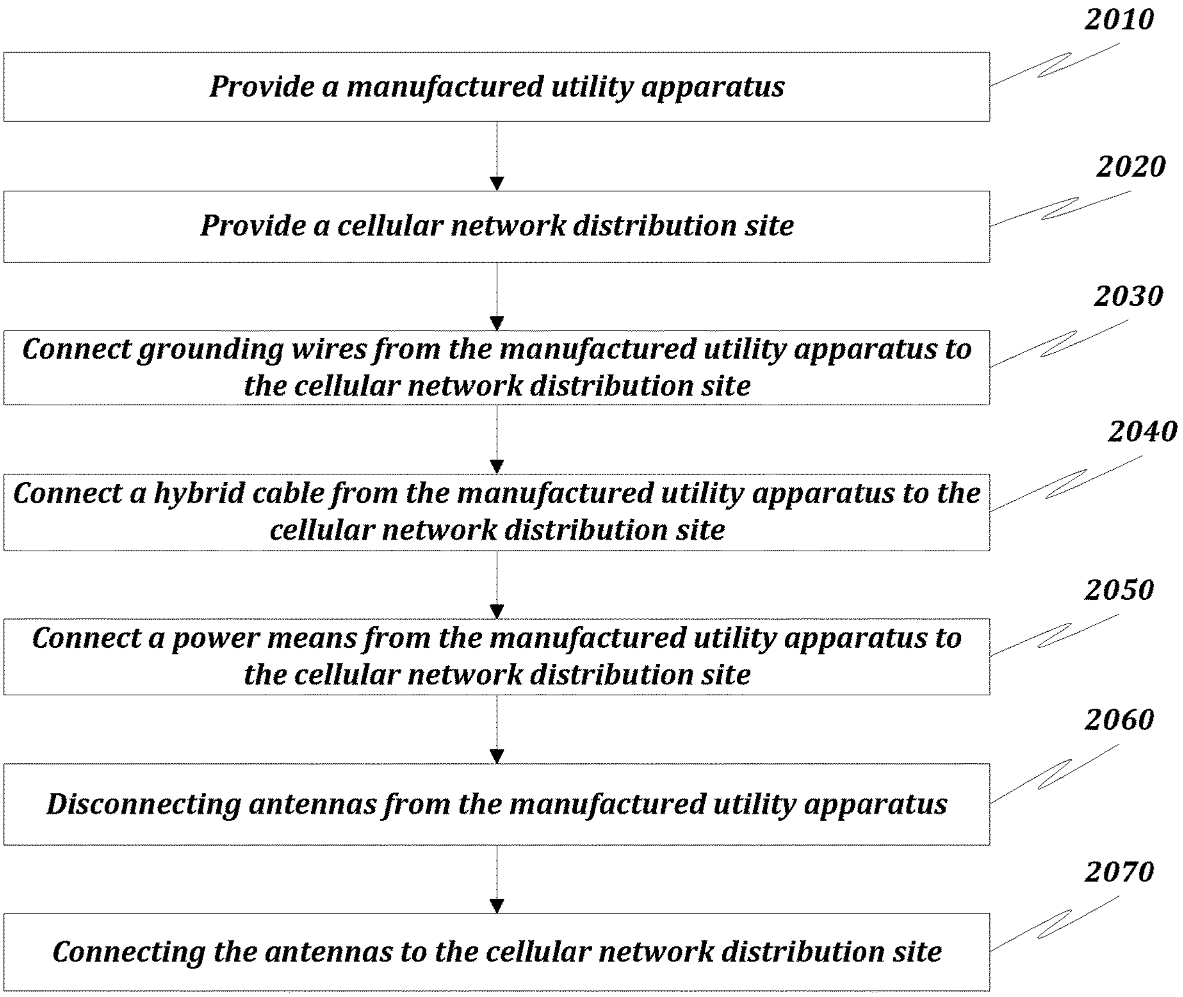
FIG. 14 illustrates a flowchart describing a second method for attaching the manufactured utility apparatus to a utility tower.

Consistent with embodiments of the present disclosure, FIG. 14 shows a method 2000 for attaching a manufactured utility apparatus to a cellular tower. The method 2000 may be embodied as, for example, but not limited to, assembly instructions and/or operations, which when executed, perform the method. One or more operations of method 2000 may be modified, rearranged, or omitted all together. Accordingly, the particular sequence of operations illustrated in FIG. 13 should not be construed as limiting the scope of one or more embodiments. The method 2000 may comprise the following stages:

2010—Providing a manufactured utility apparatus

2020—Providing or otherwise determining a cellular network distribution site (cell site) comprising a cellular network distribution tower (cellular tower)

2030—Connecting a plurality of grounding wires from the manufactured utility apparatus to the cell site

2040—Connecting a hybrid cable from manufactured utility apparatus to the cell site

2050—Connecting a power means from manufactured utility apparatus to the cell site

2060—Disconnecting a plurality of antennas from the manufactured utility apparatus

2070—Connecting the plurality of antennas to the cell site

C. Method for Deploying a Helical Grounding Anchor

Figure 15:
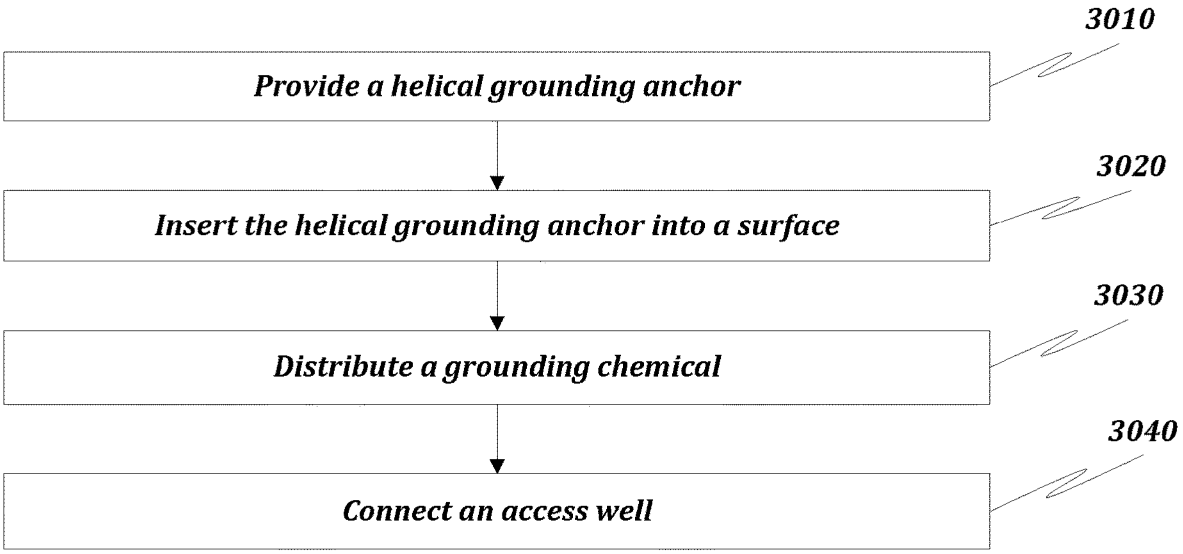
FIG. 15 illustrates a flowchart showing a third method for deploying a grounding device in the manufactured utility apparatus.

Consistent with embodiments of the present disclosure, FIG. 15 shows a method 3000 for deploying a helical grounding anchor. The method 3000 may be embodied as, for example, but not limited to, assembly instructions and/or operations, which when executed, perform the method. One or more operations of method 3000 may be modified, rearranged, or omitted all together. Accordingly, the particular sequence of operations illustrated in FIG. 14 should not be construed as limiting the scope of one or more embodiments. The method 3000 may comprise the following stages:

3010—Providing a helical grounding anchor:

a. Providing a pipe comprising an outer surface and an inner surface b. Creating a plurality of apertures in the pipe in a substantially vertical orientation c. Connecting a spiral plate to a first end of the outer surface d. Connecting at least one grounding wire proximate to a second end of the outer surface

3020—Inserting the helical grounding anchor into a surface

3030—Distributing a grounding chemical through the plurality of apertures while the helical grounding anchor is inserted into the surface

3040—Connecting an access well to the second end of the pipe

IV. COMPUTING DEVICE ARCHITECTURE

Embodiments of the present disclosure provide a hardware and software platform operative as a distributed system of modules and computing elements.

Various modules of manufactured utility apparatus 100 may be embodied as, for example, but not be limited to, a website, a web application, a desktop application, backend application, and a mobile application compatible with a computing device 600. The computing device 600 may comprise, but not be limited to the following:

A mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Various modules of manufactured utility apparatus 100 may be hosted on a centralized server or a cloud computing service. Although methods A, B, and C have been described to be performed, at least in part, by computing device 600, it should be understood that, in some embodiments, different operations may be performed by a plurality of the computing devices 600 in operative communication at least one network.

Embodiments of the present disclosure may comprise a system having a central processing unit (CPU) 620, a bus 630, a memory unit 640, a power supply unit (PSU) 650, and one or more Input/Output (I/O) units. The CPU 620 coupled to the memory unit 640 and the plurality of I/O units 660 via the bus 630, all of which are powered by the PSU 650. It should be understood that, in some embodiments, each disclosed unit may actually be a plurality of such units for the purposes of redundancy, high availability, and/or performance. The combination of the presently disclosed units is configured to perform the stages any method disclosed herein.

FIG. 6 is a block diagram of a system including computing device 600. Consistent with an embodiment of the disclosure, the aforementioned CPU 620, the bus 630, the memory unit 640, a PSU 650, and the plurality of I/O units 660 may be implemented in a computing device, such as computing device 600 of FIG. 6. Any suitable combination of hardware, software, or firmware may be used to implement the aforementioned units. For example, the CPU 620, the bus 630, and the memory unit 640 may be implemented with computing device 600 or any of other computing devices 600, in combination with computing device 600. The aforementioned system, device, and components are examples and other systems, devices, and components may comprise the aforementioned CPU 620, the bus 630, the memory unit 640, consistent with embodiments of the disclosure.

At least one computing device 600 may be embodied as any of the computing elements illustrated in all of the attached figures, including the base module, the ice bridge support module, the ice bridge module, the equipment cabinet module, the cable securing module, the H-frame module, the antenna module, the grounding module, the generator module, the GPS antenna, the Wi-Fi module, the Lift Module, and methods A, B, and C. A computing device 600 does not need to be electronic, nor even have a CPU 620, nor bus 630, nor memory unit 640. The definition of the computing device 600 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 600, especially if the processing is purposeful.

With reference to FIG. 6, a system consistent with an embodiment of the disclosure may include a computing device, such as computing device 600. In a basic configuration, computing device 600 may include at least one clock module 610, at least one CPU 620, at least one bus 630, and at least one memory unit 640, at least one PSU 650, and at least one I/O 660 module, wherein I/O module may be comprised of, but not limited to a non-volatile storage sub-module 661, a communication sub-module 662, a sensors sub-module 663, and a peripherals sub-module 664.

A system consistent with an embodiment of the disclosure the computing device 600 may include the clock module 610 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 620, the central component of modern computers, which relies on a clock. The only exceptions are asynchronous circuits such as asynchronous CPUs. The clock 610 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 600 use a "clock multiplier" which multiplies a lower frequency external clock to the appropriate clock rate of the CPU 620. This allows the CPU 620 to operate at a much higher frequency than the rest of the computer, which affords performance gains in situations where the CPU 620 does not need to wait on an external factor (like memory 640 or input/output 660). Some embodiments of the clock 610 may include dynamic frequency change, where, the time between clock edges can vary widely from one edge to the next and back again.

A system consistent with an embodiment of the disclosure the computing device 600 may include the CPU unit 620 comprising at least one CPU Core 621. A plurality of CPU cores 621 may comprise identical CPU cores 621, such as, but not limited to, homogeneous multi-core systems. It is also possible for the plurality of CPU cores 621 to comprise different CPU cores 621, such as, but not limited to, heterogeneous multi-core systems, big.LITTLE systems and some AMD accelerated processing units (APU). The CPU unit 620 reads and executes program instructions which may be used across many application domains, for example, but not limited to, general purpose computing, embedded computing, network computing, digital signal processing (DSP), and graphics processing (GPU). The CPU unit 620 may run multiple instructions on separate CPU cores 621 at the same time. The CPU unit 620 may be integrated into at least one of a single integrated circuit die and multiple dies in a single chip package. The single integrated circuit die and multiple dies in a single chip package may contain a plurality of other aspects of the computing device 600, for example, but not limited to, the clock 610, the CPU 620, the bus 630, the memory 640, and I/O 660.

The CPU unit 620 may contain cache 622 such as, but not limited to, a level 1 cache, level 2 cache, level 3 cache or combination thereof. The aforementioned cache 622 may or may not be shared amongst a plurality of CPU cores 621. The cache 622 sharing comprises at least one of message passing and inter-core communication methods may be used for the at least one CPU Core 621 to communicate with the cache 622. The inter-core communication methods may comprise, but not limited to, bus, ring, two-dimensional mesh, and crossbar. The aforementioned CPU unit 620 may employ symmetric multiprocessing (SMP) design.

The plurality of the aforementioned CPU cores 621 may comprise soft microprocessor cores on a single field programmable gate array (FPGA), such as semiconductor intellectual property cores (IP Core). The plurality of CPU cores 621 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 621, for example, but not limited to Instruction-level parallelism (ILP) such as, but not limited to, superscalar pipelining, and Thread-level parallelism (TLP).

Consistent with the embodiments of the present disclosure, the aforementioned computing device 600 may employ a communication system that transfers data between components inside the aforementioned computing device 600, and/or the plurality of computing devices 600. The aforementioned communication system will be known to a person having ordinary skill in the art as a bus 630. The bus 630 may embody internal and/or external plurality of hardware and software components, for example, but not limited to a wire, optical fiber, communication protocols, and any physical arrangement that provides the same logical function as a parallel electrical bus. The bus 630 may comprise at least one of, but not limited to a parallel bus, wherein the parallel bus carry data words in parallel on multiple wires, and a serial bus, wherein the serial bus carry data in bit-serial form. The bus 630 may embody a plurality of topologies, for example, but not limited to, a multidrop/electrical parallel topology, a daisy chain topology, and a connected by switched hubs, such as USB bus. The bus 630 may comprise a plurality of embodiments, for example, but not limited to:

- Internal data bus (data bus) 631/Memory bus
- Control bus 632
- Address bus 633
- System Management Bus (SMBus)
- Front-Side-Bus (FSB)
- External Bus Interface (EBI)
- Local bus
- Expansion bus
- Lightning bus
- Controller Area Network (CAN bus)
- Camera Link
- ExpressCard
- Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
- Small Computer System Interface (SCSI)/Serial Attached SCSI (SAS)
- HyperTransport
- InfiniBand
- RapidIO
- Mobile Industry Processor Interface (MIPI)
- Coherent Processor Interface (CAPI)
- Plug-n-play
- 1-Wire
- Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 600 may employ hardware integrated circuits that store information for immediate use in the computing device 600, know to the person having ordinary skill in the art as primary storage or memory 640. The memory 640 operates at high speed, distinguishing it from the non-volatile storage sub-module 661, which may be referred to as secondary or tertiary storage, which provides slow-to-access information but offers higher capacities at lower cost. The contents contained in memory 640, may be transferred to secondary storage via techniques such as, but not limited to, virtual memory and swap. The memory 640 may be associated with addressable semiconductor memory, such as integrated circuits consisting of silicon-based transistors, used for example as primary storage but also other purposes in the computing device 600. The memory 640 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 641, Static Random-Access Memory (SRAM) 642, CPU Cache memory 625, Advanced Random-Access Memory (A-RAM), and other types of primary storage such as Random-Access Memory (RAM).

Non-volatile memory which can retain stored information even after power is removed, for example, but not limited to, Read-Only Memory (ROM) 643, Programmable ROM (PROM) 644, Erasable PROM (EPROM) 645, Electrically Erasable PROM (EEPROM) 646 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 600 may employ the communication system between an information processing system, such as the computing device 600, and the outside world, for example, but not limited to, human, environment, and another computing device 600. The aforementioned communication system will be known to a person having ordinary skill in the art as I/O 660. The I/O module 660 regulates a plurality of inputs and outputs with regard to the computing device 600, wherein the inputs are a plurality of signals and data received by the computing device 600, and the outputs are the plurality of signals and data sent from the computing device 600. The I/O module 660 interfaces a plurality of hardware, such as, but not limited to, non-volatile storage 661, communication devices 662, sensors 663, and peripherals 664. The plurality of hardware is used by the at least one of, but not limited to, human, environment, and another computing device 600 to communicate with the present computing device 600. The I/O module 660 may comprise a plurality of forms, for example, but not limited to channel I/O, port mapped I/O, asynchronous I/O, and Direct Memory Access (DMA).

Consistent with the embodiments of the present disclosure, the aforementioned computing device 600 may employ the non-volatile storage sub-module 661, which may be referred to by a person having ordinary skill in the art as one of secondary storage, external memory, tertiary storage, off-line storage, and auxiliary storage. The non-volatile storage sub-module 661 may not be accessed directly by the CPU 620 without using intermediate area in the memory 640. The non-volatile storage sub-module 661 does not lose data when power is removed and may be two orders of magnitude less costly than storage used in memory module, at the expense of speed and latency. The non-volatile storage sub-module 661 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (661) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 600 may employ the communication sub-module 662 as a subset of the I/O 660, which may be referred to by a person having ordinary skill in the art as at least one of, but not limited to, computer network, data network, and network. The network allows computing devices 600 to exchange data using connections, which may be known to a person having ordinary skill in the art as data links, between network nodes. The nodes comprise network computer devices 600 that originate, route, and terminate data. The nodes are identified by network addresses and can include a plurality of hosts consistent with the embodiments of a computing device 600. The aforementioned embodiments include, but not limited to personal computers, phones, servers, drones, and networking devices such as, but not limited to, hubs, switches, routers, modems, and firewalls.

Two nodes can be said are networked together, when one computing device 600 is able to exchange information with the other computing device 600, whether or not they have a direct connection with each other. The communication sub-module 662 supports a plurality of applications and services, such as, but not limited to World Wide Web (WWW), digital video and audio, shared use of application and storage computing devices 600, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 662 may comprise a plurality of size, topology, traffic control mechanism and organizational intent. The communication sub-module 662 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).
- Parallel communications, such as, but not limited to, LPT ports.
- Serial communications, such as, but not limited to, RS-232 and USB.
- Fiber Optic communications, such as, but not limited to, Single-mode optical fiber (SMF) and Multi-mode optical fiber (MMF).
- Power Line communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 600 may employ the sensors sub-module 663 as a subset of the I/O 660. The sensors sub-module 663 comprises at least one of the devices, modules, and subsystems whose purpose is to detect events or changes in its environment and send the information to the computing device 600. Sensors are sensitive to the measured property, are not sensitive to any property not measured, but may be encountered in its application, and do not significantly influence the measured property. The sensors sub-module 663 may comprise a plurality of digital devices and analog devices, wherein if an analog device is used, an Analog to Digital (A-to-D) converter must be employed to interface the said device with the computing device 600. The sensors may be subject to a plurality of deviations that limit sensor accuracy. The sensors sub-module 663 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

- Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).
- Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 600 may employ the peripherals sub-module 662 as a subset of the I/O 660. The peripheral sub-module 664 comprises ancillary devices uses to put information into and get information out of the computing device 600. There are 3 categories of devices comprising the peripheral sub-module 664, which exist based on their relationship with the computing device 600, input devices, output devices, and input/output devices. Input devices send at least one of data and instructions to the computing device 600. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 600. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 664:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 600. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 600 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices covert at least one of analog signals and physical parameters to digital values for processing by the computing device 600. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 662 sub-module), data storage device (non-volatile storage 661), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A manufactured Utility Apparatus, comprising:

a base module;

an ice bridge module attached to the base module;

an equipment cabinet module attached to the base module;

a cable securing module attached to the base module, the cable securing module configured for electrically connecting the utility apparatus and a utility resource;

an H-frame module attached to the base module;

an antenna module attached to the base module, the antenna module being operatively connected to the utility resource; and a grounding module configured to electrically ground the utility apparatus and the utility resource.

2. The manufactured utility apparatus of claim 1, wherein the base module comprises a precast ground pad formed from a rigid, insulating material.

3. The manufactured utility apparatus of claim 2, wherein the precast ground pad comprises an electrically conductive railing system disposed on an upper surface of the precast ground pad, and wherein one or more of the ice bridge module, the equipment cabinet module, the cable securing module, the H-frame module, and the antenna module are electrically connected to the railing system.

4. The manufactured utility apparatus of claim 3, wherein the precast ground pad further comprises an electrically conductive grounding layer.

5. The manufactured utility apparatus of claim 3, wherein the electrically conductive grounding layer comprises a middle conductive layer disposed between the upper surface of the ground pad and a lower surface of the precast ground pad.

6. The manufactured utility apparatus of claim 3, wherein the electrically conductive grounding layer comprises a conductive underlayer disposed on a lower surface of the precast ground pad.

7. The manufactured utility apparatus of claim 6, wherein the electrically conductive grounding underlayer is formed as an electrically conductive layer having one or more of:

a mesh pattern, a serpentine pattern, or a zig-zag pattern.

8. The manufactured utility apparatus of claim 3, wherein the precast ground pad defines an aperture extending from the upper surface to a lower surface, the aperture configured to permit an electrical connection between the railing system and the electrically conductive grounding layer.

9. The manufactured utility apparatus of claim 8, wherein the aperture is configured for threaded insertion of a threaded electrical grounding key insert to electrically connect the railing system and the electrically conductive grounding layer.

10. The manufactured utility apparatus of claim 9, wherein the threaded electrical grounding key insert is configured to receive a conductive grounding insert that contacts the railing system and the electrically conductive grounding layer, wherein the conductive grounding insert further extends into earth beneath the base module.

11. The manufactured utility apparatus of claim 1, further comprising an electricity generation device for providing power to one or more of the ice bridge module, the equipment cabinet module, the cable securing module, the H-frame module, and the antenna module.

12. The manufactured utility apparatus of claim 1, wherein the precast ground pad defines an aperture configured to receive an electrically conductive grounding insert that extends through the precast ground pad and into earth beneath the base module, wherein the electrically conductive grounding insert is configured to provide a grounding electrical connection to one or more of the ice bridge module, the equipment cabinet module, the cable securing module, the H-frame module, or the antenna module.

13. The manufactured utility apparatus of claim 1, wherein the cable securing module comprises a hybrid cord, the hybrid cord comprising one or more of a conductor cord, a twist lock connector, or a cam-lock connector for electrically connecting the utility apparatus and the utility resource.

14. The manufactured utility apparatus of claim 1, further comprising a global positioning system (GPS) transceiver configured to send and/or receive location data associated with the manufactured utility apparatus.

15. The manufactured utility apparatus of claim 1, further comprising a high amperage quick connect apparatus for electrically connecting the utility apparatus and the utility resource.

16. The manufactured utility apparatus of claim 15, wherein the high amperage quick connect apparatus is configured to facilitate connections of up to 200 amperes or greater.

17. The manufactured utility apparatus of claim 15, wherein the utility resource comprises a cellular network distribution device.

18. The manufactured utility apparatus of claim 1, wherein the antenna module comprises one or more antennas configured to provide wireless radio network connectivity to a predetermined area.

19. The manufactured utility apparatus of claim 1, wherein the H-frame module comprises a disconnect module configured to electrically isolate some or all of the wiring in the manufactured utility apparatus from power provided by the utility resource.

20. The manufactured utility apparatus of claim 1, further comprising a generator configured to provide power to one or more of the ice bridge module, the equipment cabinet module, the cable securing module, the H-frame module, and the antenna module.

* * * * *